США009727883B2

United States Patent
Richardson

(10) Patent No.: US 9,727,883 B2
(45) Date of Patent: Aug. 8, 2017

(54) METHODS AND SYSTEMS FOR CONDUCTING SURVEYS AND PROCESSING SURVEY DATA TO GENERATE A COLLECTIVE OUTCOME

(71) Applicant: John Richardson, Vancouver (CA)

(72) Inventor: John Richardson, Vancouver (CA)

(*) Notice: Subject to any disclaimer, the term of this patent is extended or adjusted under 35 U.S.C. 154(b) by 214 days.

(21) Appl. No.: 13/862,326

(22) Filed: Apr. 12, 2013

(65) Prior Publication Data

US 2013/0226665 A1    Aug. 29, 2013

Related U.S. Application Data

(63) Continuation-in-part of application No. PCT/IB2012/002479, filed on Oct. 13, 2012.

(60) Provisional application No. 61/547,196, filed on Oct. 14, 2011, provisional application No. 61/596,243, filed on Feb. 8, 2012.

(51) Int. Cl.
*G06Q 10/00* (2012.01)
*G06Q 30/00* (2012.01)
*G06Q 30/02* (2012.01)

(52) U.S. Cl.
CPC ......... *G06Q 30/0203* (2013.01); *G06Q 30/02* (2013.01); *G06Q 30/0201* (2013.01)

(58) Field of Classification Search
CPC .................................................. G06Q 30/0203
USPC ........................................................ 705/7.32
See application file for complete search history.

(56) References Cited

U.S. PATENT DOCUMENTS

| | | | |
|---|---|---|---|
| 2003/0233274 A1 | 12/2003 | Urken et al. | |
| 2005/0182659 A1 | 8/2005 | Huttin | |
| 2009/0112686 A1 | 4/2009 | Sheehan et al. | |
| 2009/0144127 A1 | 6/2009 | Smith | |
| 2012/0158450 A1 | 6/2012 | Ulwick et al. | |
| 2012/0284070 A1* | 11/2012 | Sork | 705/7.11 |

FOREIGN PATENT DOCUMENTS

WO    2012162579 A1    11/2012

* cited by examiner

*Primary Examiner* — Sujay Koneru
(74) *Attorney, Agent, or Firm* — Oyen Wiggs Green & Mutala LLP; Amy M. Fong

(57) ABSTRACT

Machine-implemented methods and computer systems are disclosed for determining a collective outcome for a survey from a plurality of potential outcomes. Each outcome is a particular combination of options. Each survey participant ranks the options to develop an influent function. For each participant, the influent function is applied to each potential outcome to determine a satisfaction score for the outcome. A collective dissonance score is calculated based on the participants' satisfaction scores for the potential outcome. The potential outcomes are ordered based on a weighted combination of the satisfaction scores and the collective dissonance score for each of the potential outcomes. In particular embodiments, the methods and systems aim to determine a collective outcome that achieves greatest satisfaction and minimizes dissonance among the participants.

28 Claims, 9 Drawing Sheets

METHODS AND SYSTEMS FOR CONDUCTING SURVEYS AND PROCESSING SURVEY DATA TO GENERATE A COLLECTIVE OUTCOME

CROSS-REFERENCE TO RELATED APPLICATIONS

This application is a continuation-in-part of International Application No. PCT/IB2012/002479 filed on Oct. 13, 2012 and entitled "A METHOD AND SYSTEM FOR CONDUCTING ONE OR MORE SURVEYS", which claims the benefit of U.S. provisional application No. 61/547,196 filed on Oct. 14, 2011 and entitled "INFLUENTS ALGORITHM: A METHOD AND SYSTEM FOR MANAGING A SURVEY" and U.S. provisional application No. 61/596,243 filed on Feb. 8, 2012 and entitled "INFLUENTS ALGORITHM: A METHOD AND SYSTEM FOR MANAGING A SURVEY", the entire teachings and disclosure of which are incorporated by reference thereto.

TECHNICAL FIELD

The technology described herein relates to methods and systems for conducting surveys and processing survey data or results. Particular embodiments provide for machine-implemented methods and automated systems for conducting surveys and processing survey data or results.

BACKGROUND

Survey or polling methods may be used to identify solutions to a simple or complex problem or query where a group of participants is involved. Potential solutions to a problem may be determined by asking survey participants to provide their responses to one or more questions, and then analyzing the responses provided by the participants.

In some methods, if participants are asked to choose from a plurality of responses, the response that is chosen the most often may be selected as the basis for the final solution or outcome. This may cause an unequal satisfaction distribution between the participants who chose such response and the participants that chose other responses, resulting in a solution that lacks the full support of all participants.

Since the results for a survey are generally considered independently of other surveys, it may so happen that the satisfaction (or dissatisfaction) experienced by a participant in one survey may be repeated for the outcomes of subsequent surveys. Thus, in methods that give preference to responses chosen by the majority of participants, a participant who tends to choose responses preferred by the minority of participants may be generally left dissatisfied with the outcomes chosen for the surveys.

In addition, in some cases, particularly where the survey is complex and a large number of different responses may be provided by the participants, it may be difficult to analyze the survey results to determine a final outcome. It may be difficult in some cases to determine an outcome for which the participants' responses are given equal consideration.

There is a need for methods and systems for conducting a survey and determining a survey outcome which address the aforementioned problems.

The foregoing examples of the related art and limitations related thereto are intended to be illustrative and not exclusive. Other limitations of the related art will become apparent to those of skill in the art upon a reading of the specification and a study of the drawings.

SUMMARY

The technology described herein has a number of aspects. These include, without limitation: methods for conducting surveys, methods for analysing survey data or results, computer systems for conducting surveys, computer systems for analysing survey data or results, and methods and systems for determining a collective outcome or solution to a problem for a group of participants based on survey data or results.

Certain aspects relate to methods and systems for conducting surveys, and methods and systems for analysing survey data or results. The systems may be implemented by one or more computers, servers or machines. In particular embodiments, the surveys are conducted by one or more machines such as a survey-conducting server which is configured to present survey options to and receive responses from survey participants using their client devices. The survey-conducting server is in communication with the client devices by way of a data communication network (e.g. the Internet). The survey results are analysed by one or more machines such as a survey outcome-generating server having a data processor configured to process the input received from the survey participants and determine a collective outcome for the survey. The survey-conducting server and survey outcome-generating server may form part of a survey and collective decision-making system.

The surveys are conducted to evaluate the desirability of potential outcomes. In particular embodiments, each outcome is defined by a particular combination of options. Each option may be associated with an issue (e.g. category), a constraint, and/or a value. The survey is conducted by the survey-conducting server delivering instructions to the survey participant's client device that cause a graphical user interface (GUI) control to be displayed on the client device to allow the survey participant to provide survey input. The GUI control may display a list of issues and a set of options corresponding to each issue. In particular embodiments, the GUI control prompts the survey participant to rank the displayed issues and options to indicate the importance of that issue and desirability of that option to the participant. The survey participant ranks the issues and options using the GUI control, and the ranking is received by the survey-conducting server. The survey-conducting server performs these survey-conducting steps for a number of survey participants who are communicating using the GUI controls on their client devices, and aggregates the responses received from the participants.

Each survey participant's ranking is used by the survey and collective decision-making system to develop an influent function associated with the participant. The influent function is indicative of how the participant would like the problem to be solved, and counts as the participant's vote or ballot toward a collective outcome. The influent functions associated with the participants are provided as input to the survey outcome-generating server. A data processor of the survey outcome-generating server processes the influent functions to generate a collective influent function for the survey. The collective influent function may be generated in accordance with one or more algorithms applied by the survey outcome-generating server. For example, in particular embodiments, the survey outcome-generating server generates satisfaction scores and dissonance scores associated with each outcome based on the participants' influent functions and then uses these scores to determine a collective influent function. The data processor of the survey outcome-generating server may then apply the collective influent function to the potential outcomes to score or rank the potential outcomes. The survey outcome-generating server may store, print, display, transmit, and/or otherwise output the results (including for example the scores of the potential outcomes, collective satisfaction score, collective dissonance score, and individual satisfaction scores). In certain embodiments, the results may be displayed in the form of a graph (e.g. a graph for each potential outcome displaying information such as satisfaction levels, dissonance and a score for the outcome based on the application of the collective influent function).

Particular aspects relate to a method which evaluates the satisfaction level of each survey participant for a potential outcome based on the participant's response (e.g. the participant's influent function), and assesses differences in the satisfaction levels among the survey participants to determine a dissonance level. This evaluation may be repeated for each potential outcome. Each potential outcome may then be ranked based on the satisfaction levels and dissonance levels among the participants. In particular embodiments, the method may take into account the dissatisfaction that would result from an unfair distribution of satisfaction for a given outcome. The method aims to provide the highest ranking to the outcome that would create the greatest satisfaction among the participants while minimizing dissonance.

Another aspect provides for a method that considers satisfaction and dissonance experienced by a participant in a previous survey to determine the outcome in a current survey.

Other aspects provide systems for implementing the above-described methods. For example in particular embodiments, a survey conducting and collective decision-making system is provided, having survey-conducting means for presenting options to client devices and receiving a response. The survey-conducting means delivers instructions to a client device that cause a GUI control to be displayed on the client device. The GUI may display a list of issues and a set of options corresponding to each issue. In particular embodiments, through the GUI control the survey-conducting means prompts a survey participant to rank the issues and options to indicate the importance of that issue and desirability of that option to the participant. The survey-conducting means performs these survey-conducting steps for a number of survey participants who are communicating using the GUI controls on their client devices, and aggregates the responses received from the participants.

The system may also have an influent function development means to turn each survey participant's ranking into an influent function associated with a survey participant. As noted above, the influent function is indicative of how the participant would like the problem to be solved. The system may have various results-analyzing means for processing the influent functions associated with the participants to determine a collective outcome for the survey. Results-analyzing means may include, for example: means for generating individual satisfaction scores associated with each participant for each potential outcome, means for generating a collective satisfaction score for each potential outcome, means for generating a dissonance score for each potential outcome, and means for determining a collective influent function. Means for determining a collective influent function may generate a collective influent function based on the satisfaction scores and dissonance scores. The system may also include means for applying the collective influent function to the potential outcomes to score or rank the potential outcomes. The system may have results-outputting means for storing, printing, displaying, transmitting, and/or otherwise outputting the results. In some embodiments, such survey-conducting means, results-analyzing means and results-outputting means may be implemented by software instructions stored in a program memory and executable by a data processor. The data processor executes the software instructions to carry out the means described.

In addition to the exemplary aspects and embodiments described above, further aspects and embodiments will become apparent by reference to the drawings and by study of the following detailed descriptions.

BRIEF DESCRIPTION OF DRAWINGS

In drawings which illustrate non-limiting embodiments.

DESCRIPTION

Throughout the following description, details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
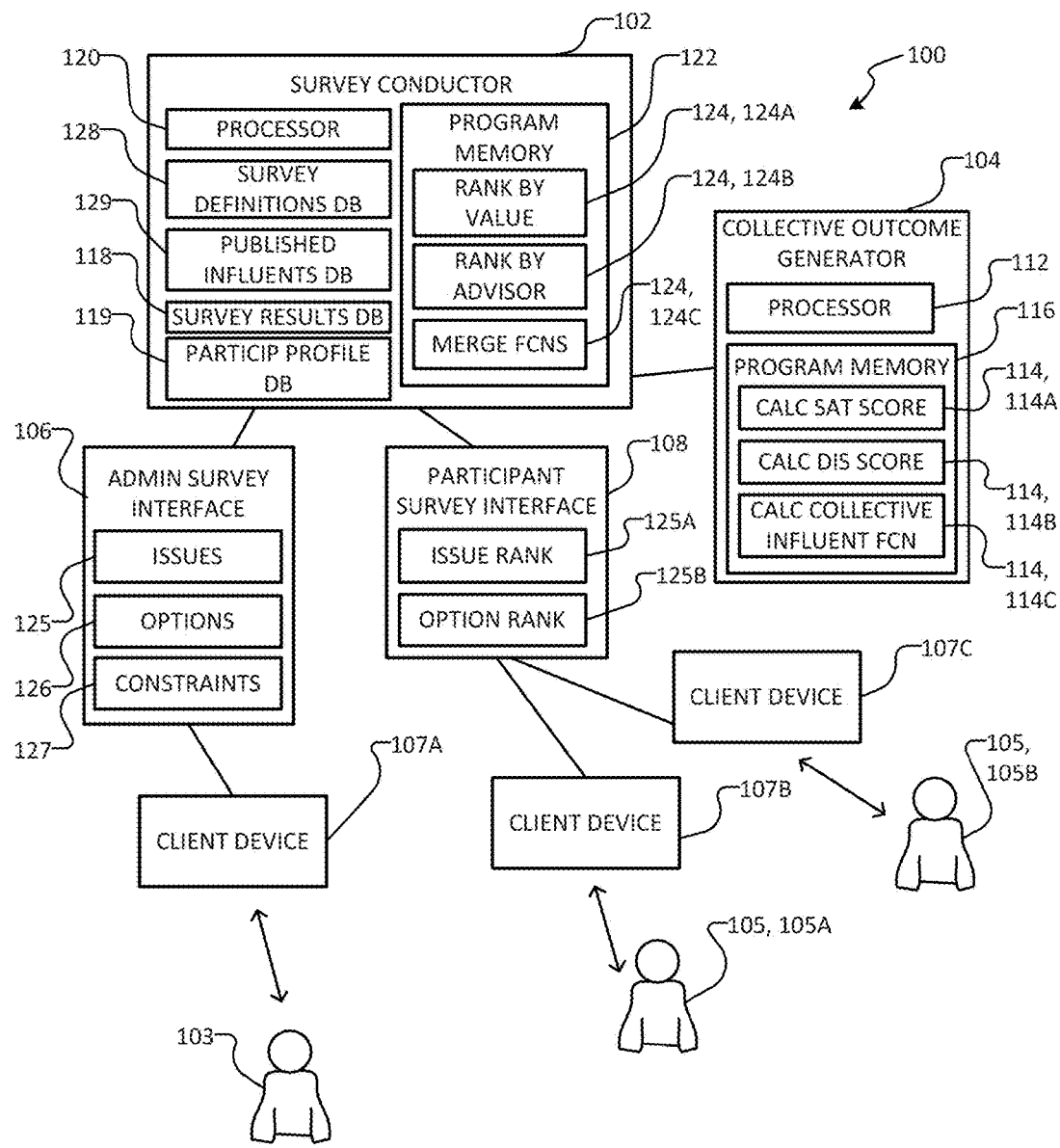
FIG. 1 illustrates a system according to one embodiment.

The technology described herein relates to a survey and collective decision-making system which prompts for and receives survey input and generates a collective decision for a query based on the survey input. FIG. 1 shows a survey and collective decision-making system 100 according to a particular embodiment. System 100 includes a survey conductor 102 and a collective outcome generator 104 which are configurable to be in communication with one another. Survey conductor 102 and collective outcome generator 104 (or various aspects of each) may be implemented using one or more computers, servers, processing units, data processors, CPUs, microprocessors and/or any other machine or component suitably configured to perform one or more of the methods described herein. As will be appreciated by one of skill in the art, it is not necessary that survey conductor 102 and collective outcome generator 104 are provided by separate servers or machines as shown in FIG. 1; in other configurations both survey conductor 102 and collective outcome generator 104 may be provided on the same server or machine and share a common processing unit. In some configurations the functions described herein may be distributed differently among the survey conductor 102 and collective outcome generator 104 than as indicated in FIG. 1 or explained herein.

Survey conductor 102 may be provided as a server which is configured to prompt for and receive input from users of the system 100. As shown in FIG. 1 such users may include survey administrators 103 and survey participants 105A, 105B (individually and collectively, 105). Survey administrator 103 may provide input to survey conductor 102 by way of an administrative survey interface 106 accessible through and displayed on a client device 107A. Similarly, survey participants 105 may provide input to survey conductor 102 by way of a participant survey interface 108 accessible through and displayed on their client devices 107B, 107C.

Survey conductor 102 may be configurable to be in communication with client devices 107A, 107B and 107C (individually and collectively, 107). Client devices 107 may communicate with survey conductor 102 by way of a data communication network, such as the Internet, for example. In some embodiments, client devices 107 may also communicate with one another by way of a data communication network, such as in the social networking implementation described below with reference to FIG. 2. Client devices 107 may include personal computers, laptops, tablets, smart phones, mobile devices, or any other device capable of connecting to the data communication network, such as the Internet, for communicating with survey conductor 102 and/or with another (e.g. through a server such as survey conductor 102).

Once survey administrator 103 has logged into the system, he may use the administrative survey interface 106 to define a query or problem to be solved. He may also use the interface 106 to define a list of possible responses to the query or problem. In particular embodiments, the list of possible responses is organized in the form of issues 125 (categories) and corresponding options 126 for each issue 125. Survey administrator 103 may also define constraints 127 for the available options or outcomes (e.g. logical constraints or cost constraints). The defined issues 125, options 126 and constraints 127 for the survey may be stored in a survey definitions database 128 that is stored on survey conductor 102 as illustrated in FIG. 1 or otherwise accessible to survey conductor 102.

Once the survey has been defined by survey administrator 103, the query and the possible responses are presented by the survey conductor 102 to each of the survey participants 105 by way of participant survey interface 108. Survey participants 105 are asked to indicate how they would prefer the query or problem to be solved. Where the possible responses are organized by issues 125 and options 126, survey participant 105 may be asked to submit a ranking 125A for each issue 125 and a ranking 126A for each option 126. Ranking 125A is indicative of the degree of importance that the survey participant 105 accords to issue 125 and ranking 126A is indicative of the degree of support that the survey participant 105 has for option 126. Rankings 125A, 126A suggest how the participant 105 would like the survey query or problem to be solved. Rankings 125A, 126A are submitted by way of participant survey interface 108 to survey conductor 102. Survey conductor 102 may store each participant 105's rankings 125A, 126A (for later use) in a survey results database 118 stored on survey conductor 102 or otherwise accessible to survey conductor 102.

In some embodiments the survey participants may be able to choose from a number of different methods for ranking the issues and options or generating influent functions. These methods may be enabled by survey conductor 102 in some embodiments. For example, a processor 120 of survey conductor 102 may have available to it a number of software routines 124 stored in a program memory 122 which when executed generate particular rankings 125A of issues 125 and rankings 126A of options 126. Such routines may include, for example, routines 124A for ranking by values, routines 124B for ranking by trusted advisors, and routines 124C for merging two or more influent functions. Survey conductor 102 may also contain, or have access to, an influent functions repository 129 which stores influent functions published by survey participants. These influent functions may be made available to other survey participants for use in generating new influent functions. Methods for generating rankings and/or new influent functions are described in further detail below.

The responses that are provided by survey participants 105 through participant survey interface 108 may be submitted by survey conductor 102 to collective outcome generator 104 for processing. As discussed above, these responses may be in the form of rankings 125A, 126A of issues 125, options 126 respectively. Such rankings determine an influent function which is indicative of the participant's satisfaction level for each outcome. For each potential outcome, the collective outcome generator 104 uses each participant's response or influent function to determine a satisfaction score associated with the survey participant for that outcome. The collective outcome generator 104 determines a collective satisfaction score for each potential outcome. The collective satisfaction score may be based on a weighted combination of all of the individual satisfaction scores of the survey participants for that outcome. The collective outcome generator 104 also determines a collective dissonance score for each potential outcome. The collective dissonance score may be a measure of the differences in the individual satisfaction scores among the survey participants for a particular outcome.

The collective outcome generator 104 subsequently determines a collective influent function. The collective influent function may be some weighted combination of the collective satisfaction score and collective dissonance score for each potential outcome. The resulting collective influent function is used by the collective outcome generator 104 to rank each potential outcome for the survey. The highest ranked potential outcome may be selected as a collective outcome for the survey.

In the illustrated embodiment of FIG. 1, collective outcome generator 104 has a processor 112 which is operable to call software routines 114 stored in program memory 116 accessible to processor 112. Routines 114 may consist of, for example, a compute collective satisfaction score routine 114A, a compute collective dissonance score routine 114B, and a generate collective influent function routine 114C. While not shown, other routines 114 that may be available to processor 112 of collective outcome generator 104 include, for example: an eliminate non-actionable outcomes routine which may eliminate any outcomes that do not meet the predefined constraints, a rank outcomes routine which may apply the collective influent function routine to rank each potential outcome, and various routines for using the past experiences (satisfaction levels) of survey participants in previous surveys to determine the collective influent function of a current survey (or to adjust the survey participants' influent levels or weight accorded to their satisfaction scores, which in turn affects the collective influent function). As will be appreciated by one of skill in the art upon reading this specification, many other routines may be provided to processor 112 of collective outcome generator 104 that are not specifically illustrated in FIG. 1. One or more of the methods described herein may be performed by processor 112 executing software instructions provided by software routines 114.

Figure 2:
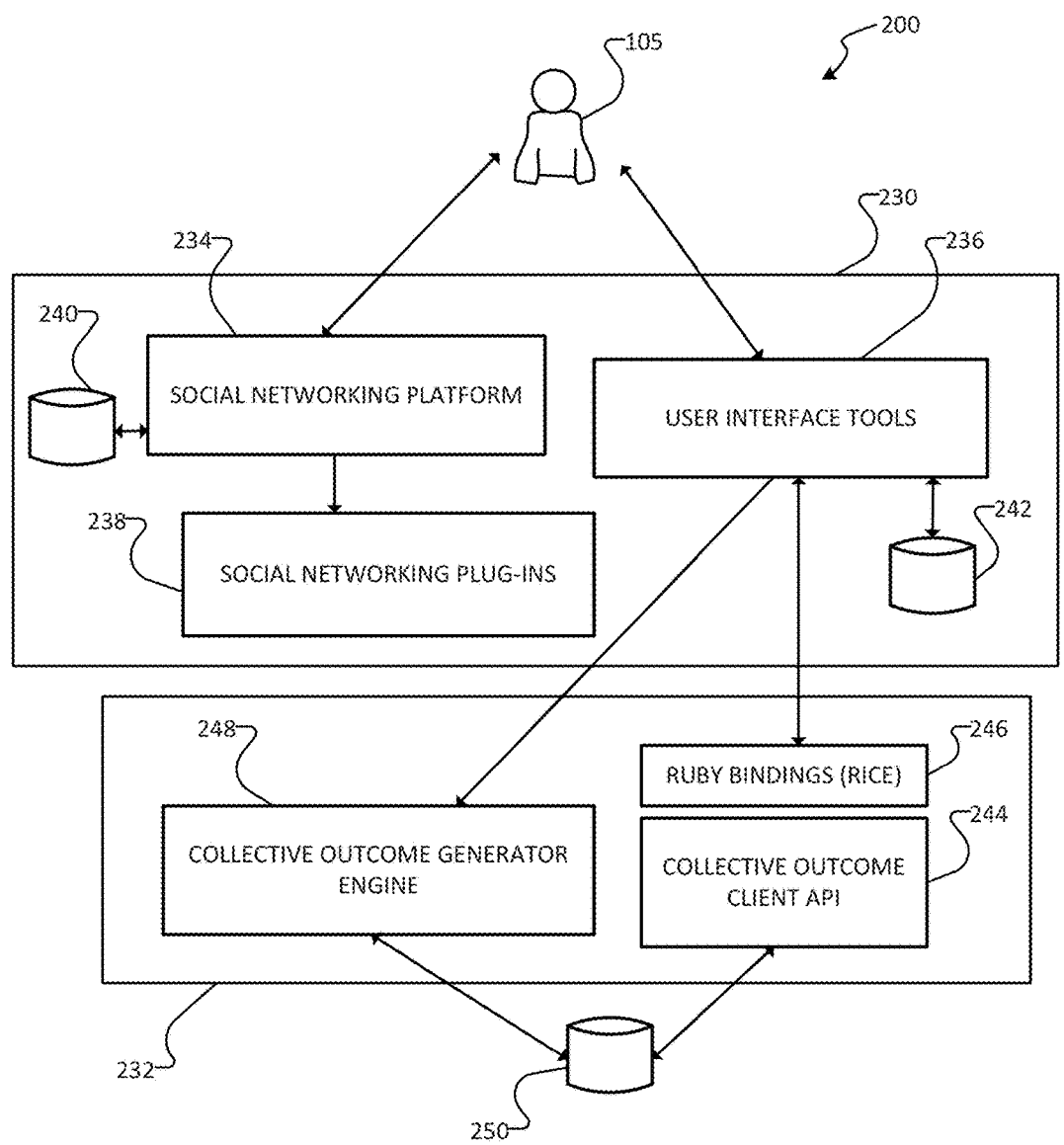
FIG. 2 illustrates a particular implementation of components of the FIG. 1 system according to one embodiment.

FIG. 2 illustrates a system 200 which is a particular implementation of survey conductor 102 and collective outcome generator 104 of FIG. 1's system 100. FIG. 2's system 200 is implemented in the context of an online social network, wherein each user or survey participant 105 is also a member or user of the social network. In system 200, users 105 access and interact with a front-end survey platform 230 to view a survey and input survey responses (e.g. such as by providing rankings of issues and options as discussed above). Survey platform 230 can be considered to implement the functions of survey conductor 102 of FIG. 1's system 100 (including for example methods for collecting survey data; methods for ranking issues and options and generating influent functions). In the illustrated embodiment of FIG. 2, survey platform 230 incorporates a social networking platform 234, one or more social networking plug-ins 238, and user interface tools 236. The user interface tools 236 have access to a user interface database 242 and may be used to implement the participant survey interface 108 and administrative survey interface 106 of FIG. 1's system 100.

In particular embodiments, the social networking platform 234 consists of the BuddyPress™ platform (a Word-Press™-based social networking platform). In other embodiments, other types of social networking platforms may be incorporated into survey platform 230. The social networking plug-ins 238 to the social networking platform 234 may include plug-ins to provide survey data on friend networks, and user profile pictures, etc. Social networking platform 234 has access to a database 240 which stores the social networking data such as user profiles, friend relationships, comments entered by users, etc. In particular embodiments of a survey conducting and collective decision-making system, social networking platform 234 provides the means for users 105 to communicate information with one another in order to accomplish various objectives of the system such as assisting one another to make decisions as to the responses and generating rankings and influent functions.

The use of a social networking platform 234 in FIG. 2's system 200 may provide a number of advantages directed toward facilitating informed and collective decision-making by, for example, allowing users 105 to share their responses, rankings or influent functions or comments related thereto with other users 105, and providing a user 105 with the recommendations of other users 105 (which may be particularly helpful when voting/ranking by value or by trusted advisor). A user 105 may also use the social networking site to add other users 105 to his trusted network of advisors to help him decide on a response.

FIG. 2's system 200 also includes a survey results analyzer 232. Survey results analyzer 232 can be considered to implement the functions of collective outcome generator 104 of FIG. 1's system 100 (including for example methods for calculating satisfaction scores, dissonance scores and a collective influent function). In the illustrated embodiment of FIG. 2, survey results analyzer 232 includes a collective outcome generator engine 248, a database 250 for storing the computational results generated by engine 248, and a client application programming interface (API) 244 and bindings 246 for enabling communication of data and instructions between the survey results analyzer 232 and the survey platform 230.

FIG. 1's system 100 and FIG. 2's system 200 or portions thereof may be configured to implement one or more of the methods described herein. The methods are described in more detail below.

During a survey conducted by the survey and collective decision-making system, each survey participant is invited to submit a response to the query which is indicative of his or her preferred decision or outcome. As noted above, in particular embodiments, possible responses are presented to the participant in the form of issues (or categories) and a corresponding set of options for each issue. A participant is asked to rank each issue and option to indicate how important each issue is and how desirable each option is to the participant in the determination of the collective outcome. Such ranking of issues and options constitutes, or is used as the basis for determining, an "influent function" associated with the participant. A participant's influent function can be applied to each potential outcome to calculate a satisfaction score for the outcome. The satisfaction score reflects the participant's satisfaction level with respect to that outcome. The survey participants' influent functions or satisfaction scores can also be used to calculate a collective "dissonance score" with respect to each potential outcome. One manner of calculating the dissonance score is to measure a difference in the satisfaction scores among the participants for a particular outcome. As one example, the dissonance score may be calculated based on the standard deviation of the survey participants' satisfaction scores. This and other techniques for calculating a dissonance score are discussed in further detail below. The dissonance score may be used as a measure of the participants' tendency to reject or act against a particular outcome (or conversely, the participants' tendency to support a particular outcome) due to feelings of unfairness or inequity.

A collective decision generator aggregates the influent functions generated for each survey participant and, based on such influent functions, determines a collective influent function for the survey. The collective influent function may be based on the calculated satisfaction scores and the collective dissonance score for each potential outcome. In particular embodiments, the collective influent function consists of a weighted combination of a collective satisfaction score and a collective dissonance score for each potential outcome. The collective satisfaction score may be based on a weighted combination of the individual satisfaction scores associated with each of the survey participants.

A ranked list of the potential outcomes may be determined by applying the collective influent function to each potential outcome. In particular embodiments, a principle on which the collective influent function is based is that a decision which has a high average satisfaction level from a group of participants but a significant dissonance or difference in satisfaction levels may be less preferable than another decision which has lower dissonance or difference in satisfaction levels even if the average satisfaction level for that other decision is lower. Thus, for example, the collective influent function may rank outcomes which have a lower average satisfaction level and lower dissonance above other outcomes which have a higher average satisfaction level and greater dissonance. After applying the collective influent function to rank each potential outcome, the highest ranked outcome which is within the pre-defined constraints (e.g. logical constraints, cost constraints, or other constraints) may be selected as the collective outcome for the survey.

The number of potential outcomes to a problem can be very large. For example, for a survey query having 6 issues and 4 options for each issue, the total number of potential outcomes, before any constraints are applied to eliminate non-actionable outcomes, is $4^6$ or 4096 (assuming that only one of the options can be selected for each issue). Accordingly, to interpret the survey results in a meaningful manner, computer systems having one or more data processors for processing the survey results may be engaged (such as the computer systems described above with reference to FIGS. 1 and 2). The data processor executes instructions provided by software routines to process the results, and scores or ranks the potential outcomes based on this analysis. Since, in accordance with the methods described herein, influent functions must be applied to each potential outcome, it can be appreciated that the determination of a final result by the data processor can be computationally intensive. In order to distribute the computation over a time period and ease the computational burden when combining survey results, some of the computation, such as calculation of a participant's satisfaction scores for each potential outcome, may be performed by the data processor once a participant has provided his responses, and stored in a database for later use. After all of the survey participants have submitted their input, the data processor of the collective outcome generator may use the pre-calculated information when determining a collective influent function.

The following is a non-limiting example of how a survey and collective decision-making system as described herein may be used. Consider the case where a company wishes to determine an employee compensation package for its employees. The company may wish to survey its employees (and/or management or other interested persons) to determine what to put into its compensation package. In setting up the survey, the issues defined by the survey administrator may consist of: (1) vacation days, (2) sick days, (3) benefits, (4) severance, and (5) wage increases. Options for issue (1) vacation days may consist of: (i) two weeks plus statutory holidays, (ii) three weeks plus statutory holidays, and (iii) four weeks plus statutory holidays. Likewise, other options may be defined for each of the other issues of the survey. The survey administrator may set various constraints for the outcome or options. For example, one constraint may be that the particular combination of options chosen for the compensation package must not exceed a predetermined cost.

Once the issues, options and constraints have been defined, each survey participant is prompted to indicate a ranking for each issue and option (which is indicative of the weight, importance or support that he gives to the issue or option). In particular embodiments, the form of rankings of the issues is different from that for the rankings of the options. For example, for the ranking of issues, a participant may be required to allocate a percentage to each issue to indicate its relative importance, wherein the percentages over all the issues total 100%. Thus, an example issue ranking submitted by a survey participant for the employee compensation package survey might be: (1) vacation days 30%, (2) sick days 15%, (3) benefits 25%, (4) severance 10%, and (5) wage increases 20%. For the ranking of options, on a scale between −100 and +100, a participant may be prompted to indicate how much the participant desires or supports (or does not support) a particular option, where +100 indicates full support, 0 indicates a neutral opinion, and −100 indicates strongly opposed. For example, for issue (1) vacation days, the participant might indicate a ranking of +10 for option (i) two weeks plus statutory holidays, a ranking of +70 for option (ii) three weeks plus statutory holidays, and a ranking of +100 for option (iii) four weeks plus statutory holidays. By submitting such rankings for issues and options, a survey participant may fine-tune his preferences for his vote toward a collective outcome.

The rankings of issues and options from a survey participant may be implemented by user interface tools (such as user interface tools 236 of FIG. 2 supporting a participant survey interface 108 of FIG. 1 as described below). The user interface tools may include software functions that enforce certain constraints on the rankings to ensure that only valid rankings are received. For example, where the survey participant is requested to allocate a percentage weight to each issue, the survey participant may start by moving a cursor to slide the percentage "weight" bar for the first issue (e.g. vacation days in the example above) all the way to the right to allocate 100% importance to the first issue. The user interface tools then force all of the other issues to be displayed as 0% importance since the cumulative weight cannot exceed 100%. If the survey participant subsequently slides the weight bar on the second issue (e.g. sick days in the example above) to indicate 40% importance, then the user interface tools adjust the percentage weight for the first issue down to 60%. The user interface tools may also enable a user to lock an issue's weight bar at a certain percentage weight.

The particular ranking of issues and options that is selected by the participant determines an influent function associated with the participant. The influent function is indicative of how the participant would like the employee compensation package to be determined. Based on the influent functions, satisfaction scores and dissonance scores for each potential outcome may be calculated by processor 112 of collective outcome generator 104 or processor 120 of the survey conductor 102 of FIG. 1. In the employee compensation package scenario, each potential outcome is one possible combination of options making up the employee compensation package.

The collective outcome generator 104 gathers all of the influent functions developed by the survey participants and determines a collective influent function. Determination of the collective influent function may take into account the calculated satisfaction scores, dissonance scores and/or other factors. The collective influent function may be used to rank each potential outcome. In the employee compensation package scenario discussed above, the collective influent function might determine that within the constraints given (e.g. cost), an employee compensation package having a particular combination of options achieves the best balance between maximizing satisfaction levels and minimizing dissonance levels for the group surveyed. Accordingly, this combination of options may be selected as the collective outcome for the survey, and presented to the company for consideration as the compensation package which would tend to have the most support from the group and face the least resistance due to dissonance or inequity in support levels. In some cases, more than one potential outcome may be shortlisted based on the rankings by the collective influent function and presented to the decision-maker as candidates for the final collective outcome.

In some embodiments, the survey participants may be provided with more than one way in which to rank the issues and options. For example, as described in further detail below, survey participants may be able to rank the issues and options by relative importance of values. When a participant wants to rank in accordance with a particular value (e.g. "environmental sustainability"), the participant may prioritize or give more support to the issues and/or options which best reflect that value. Each value may be associated with an influent function developed by the participant (or other influent functions developed by others) which have a ranking of issues and/or options that reflect that value. Sometimes a participant may want to rank in accordance with more than one value. In such case the participant may assign relative weights to each value (e.g. 70% "environmental sustainability" and 30% "sense of community"). The survey and collective decision-making system may then develop a new influent function for the participant that combines an influent function associated with "environmental sustainability" with an influent function associated with "sense of community" in accordance with the relative weights that the participant has assigned to these values. As discussed in more detail below, a participant may also rank issues and options by accepting the suggested recommendations of trusted advisors, or by merging together influent functions or modifying influent functions published by other participants. Other possibilities are also described below.

It can be appreciated that a survey and collective decision-making system as described herein may have useful and practical applications in determining a collective outcome based on input from a group of participants in a variety of different decision-making contexts. By way of non-limiting example, in addition to the employee compensation package scenario discussed above, applications of the system include: public (or non-public) consultations (e.g. determining the features of a new community centre or school; deciding on a platform for a political party; deciding on a budget for a government, charity or other organization); public mediations and arbitrations; board governance; shareholder meetings; collective decision-making by employees or union members (e.g. determining a resolution to a labour dispute); and soliciting feedback for product development, trading, and market testing purposes and the like.

Figure 3:
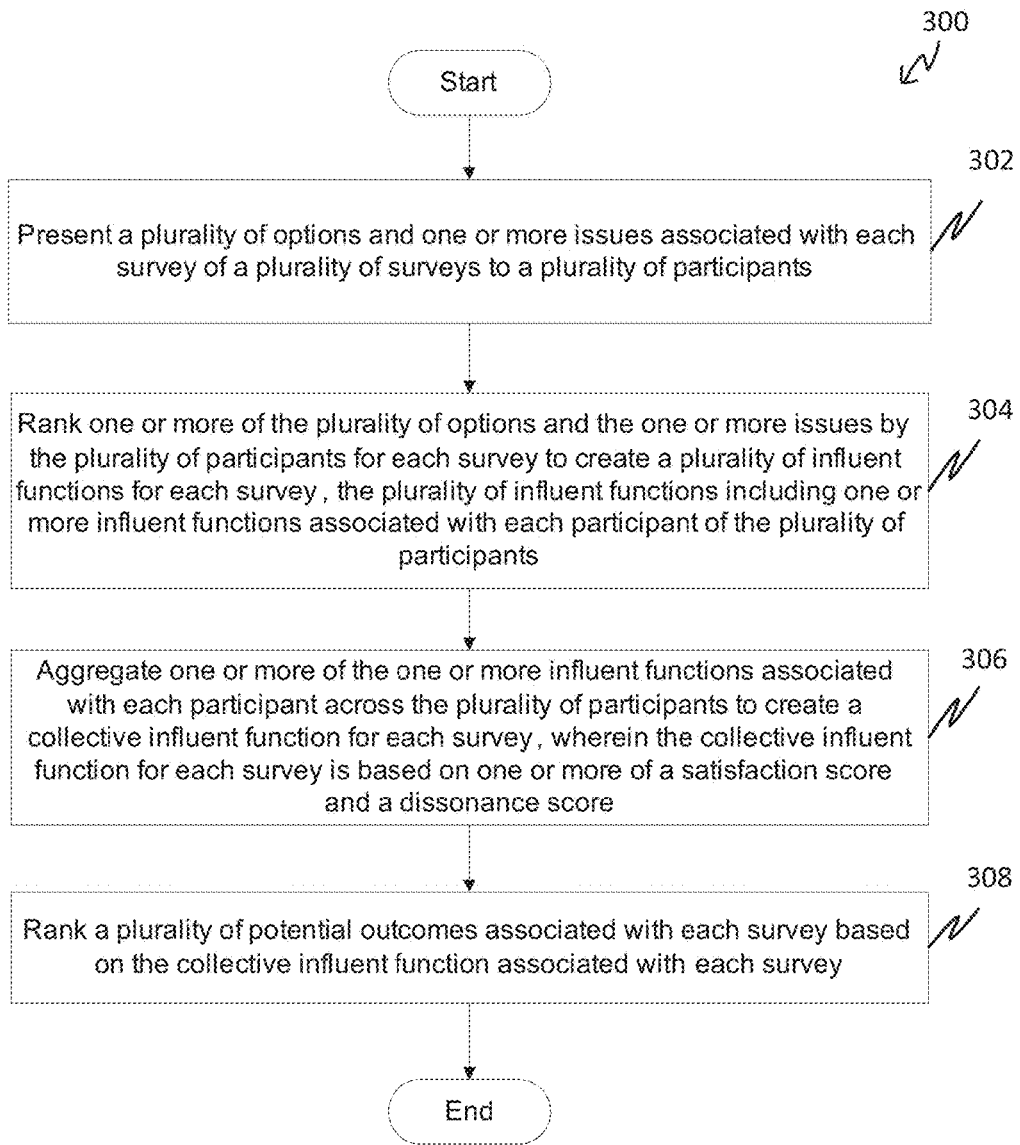
FIG. 3 is a flowchart of a method in accordance with one embodiment.

FIG. 3 is a flowchart of a method 300 of conducting a survey and analysing survey results in accordance with one embodiment. Method 300 can be performed to collect input from survey participants as to their preferences for solving a particular problem or query, and to determine a collective outcome based on such input. Method 300 may be repeated for a plurality of surveys to generate a collective outcome or decision for each survey. The surveys correspond to a decision series $\mathcal{D}$ comprising a plurality of collective decisions made at different time instances such that, $\mathcal{D} = \{D(t_1), D(t_2), \ldots, D(t_n)\}$; where $D(t)$ represents a collective decision made at time instance t.

Method 300 may be implemented by components of FIG. 1's system 100 and/or FIG. 2's system 200. For example, certain steps of method 300 may be implemented by software which is contained in a program memory 116 accessible to a processor 112 of the collective outcome generator 104 of FIG. 1. Other steps of method 300 may be implemented by software contained in a program memory 122 accessible to a processor 120 of the survey conductor 102 of FIG. 1. Processors 112, 120 execute the software instructions provided by the software to carry out the method steps. Users of the system including survey participants 105 and survey administrators 103 can provide input to the software via the participant survey interface 108 and administrator survey interface 106 of FIG. 1.

Method 300 begins at step 302, at which a plurality of options is presented to a plurality of participants. The options may be categorized into various issues. For example, one issue may include two or more options. The issues and their corresponding options may be defined by the survey administrator(s). In some embodiments, a new option for an existing issue (or a new issue and corresponding new options) may be defined by the survey participants.

An option may be associated with a set of characteristics. The characteristics of an option a is defined as $C'(a) = \{c_1(a), c_2(a), \ldots, c_n(a)\}$ where $C'$ is a set of alphanumeric phrases. For example, if option a is a car, then $c_1$ may be cost, $c_2$ may be mileage, $c_3$ may be color, etc. The characteristics associated with an option may also be defined by taking a function of other characteristics associated with that option. For example, if option a is a house, $c_1$ is cost and $c_2$ is square footage, then a third characteristic, the cost per square foot can be defined as: $C'(a) = c_1(a)/c_2(a)$.

A potential outcome for a survey can be defined as a particular combination of the options that are presented to the survey participants. The potential outcomes may be associated with sets of characteristics. The sets of characteristics will not always be reducible to characteristics of the isolated options. In some cases, the sets of characteristics are defined by the interaction of characteristics of the isolated options across a potential outcome. For example, two participants may be deciding how to spend an evening; what restaurant to have dinner at, what movie to see, etc. A characteristic that does not arise from any of the options in isolation might be how far away the restaurant is from the closest movie theatre that is playing the movie they choose, which in turn interacts with the type of transportation to generate an approximate travel time. $C''(O)$ represents the set of characteristics for a potential outcome O where $C''$ is a set of alphanumeric phrases, and for each potential outcome $O \in A'$ is an alphanumeric phrase. Here, A' is the set of all possible sets of A, where A is the set of options associated with a survey.

The net characteristics associated with an outcome include characteristics associated with the options that comprise the outcome and also characteristics that arise as a result of interaction of characteristics of the isolated options across an outcome. The net set of characteristics associated with an outcome is given by: $C(O) = C'(O) \cup C''(O)$.

Moving on, $P = \{P_1, P_2, \ldots P_n\}$ represents the set of participants associated with the decision series $\mathcal{D}$, wherein $\|P\| = p$ is the number of participants participating in the decision making process and $x \in P$ represents a participant x in the set of participants P.

The plurality of options presented for making a decision D is indicated as a set of options A such that $A = \{a_1, a_2, \ldots, a_n\}$. $\|A\| = n$ represents the number of options for the decision D. A' is the set of all possible sets of A, $A' = \{\emptyset, (a_1), (a_1, a_2), \ldots, (a_1, a_2, \ldots, a_n)\}$.

As stated earlier, potential outcomes can be defined as different combinations of the plurality of options. However, some combinations of options might result in impossible or impractical potential outcomes. In other words, some combinations may lead to non-actionable outcomes. To eliminate the non-actionable outcomes from consideration, one or more constraints or rules may be specified. The constraints may be specified by the survey administrator and/or by the survey participants. Constraints may be framed as Boolean logical relations between options and groups of options. Rules can be framed as mathematical or logical functions based on influent functions and characteristics associated with options or outcomes. If Boolean logical relations are used to determine non-actionable outcomes, a function L mapping from the set of outcomes A' to true or false, L: $A' \rightarrow \{T, F\}$ is defined. Thus, L: $C(O) \rightarrow \{T, F\}$ is a constraint on the set of outcomes, such that each possible combination of options is given a true or false value indicating whether it is actionable or not. Similarly, other constraints may be defined using rules that are defined by the survey administrators and/or by the survey participants. For example, an organization may decide to have gender equity on its board. In elections to the board where each voter rates all the candidates, a rule can be defined that eliminates any outcomes that include a combination of candidates that is not gender balanced or exceeds the size of the board.

Thus, by applying constraints, a subset $O^a$ of A' is determined to be the set of actionable outcomes. Here, the set of actionable outcomes is actionable for the plurality of participants as a whole and not to any individual participant. Since, $O^a \subset A'$ such that $O \in O^a$, $L(O)=T$ for logical constraints L.

Issues may be defined to group the options, generally into non-overlapping categories. An issue associated with a survey may include two or more options. An issue may be considered a set which covers all options belonging to that issue. An "issue set" is a set of issues such that every option belongs to one or more issues in an issue set. Issue sets are closed when no options belong to more than one issue. Closed issue sets can be nested to create "issue domains". That is, there can be a tree hierarchy of closed issue sets which together form a single "issue domain". For example, in a shopping environment, one issue domain may have "food" containing all the options desired, and under that issue might be sub-issues such as "meat" or "vegetables" which in turn may be divided into sub-issues such as "organic" or "processed", etc.

Take an issue u which is a subset of the total set of options A, i.e., $u \subset A$. U represents a closed issue set wherein $U=\{u_1, \ldots u_n\} \subset A'$. Here, U is a partition of A into non-overlapping sets such that $\cap u_i = \emptyset$ and $\cup u_i = A$. A closed issue set $U_1$ may be a subordinate to a closed issue set $U_2$ if $U_1 \subset U_2$, that is, for every $u \in U_1$, $u \subset v$ for some $v \in U_2$. U' is an issue domain, wherein U' is a nested series of issue sets represented as: $U'=\{U_1, \ldots, U_s\}$ and $U_1 \subset U_2 \subset \ldots \subset U_s$.

At step 304 of FIG. 3's method 300, a ranking for each of the issues and options associated with the survey is received from each survey participant. Optionally, the rankings may be based on a criterion or value. Ranking may include one or more of: assigning a numerical score, a percentage weight, or a function over a numeric range associated with a characteristic associated with an option. In particular embodiments, a function over a numeric range may be assigned by a participant using a graphic interface to draw a continuous line over an x-axis representing the function. Ranking may also include choosing a word or phrase such as "highly support" where that word or phrase corresponds to a numerical score or percentage weight. A range of a rank to be allocated to an issue or option may be predetermined. The range of ranks associated with issues may be different than the range of ranks associated with options. By way of non-limiting example, ranks for issues may be a percentage weight indicating relative importance, and ranks for options may be chosen from a range of 1 to 10, 0 to 100, or −100 to +100 (where a negative rank signals opposition). In cases where the negation of an option is not a logical consequence of one or more other options, a second option specifically negating the option may be inferred and the ranking of that inferred option may be derived from the ranking given to the first option. The range of ranks may be defined by the survey participants in some cases. Ranking of the issues and options by the survey participants creates a plurality of influent functions. Each participant may be associated with one or more influent functions as described below. An influent function associated with a survey may be defined as a function that orders a plurality of potential outcomes associated with the survey.

In particular embodiments, ranking the plurality of options by a participant creates an influent function associated with the participant. An influent function φ is a function that maps each outcome to $\mathbb{R}$, where $\mathbb{R}$ is a range within the set of real numbers. The range could be a finite set, e.g. the integers between 1 and 1000 or some machine-readable representation of the real number line or a subset thereof. The less points in the range, the less computing resources are required (but the less accurate the results). Based on the ranking provided by a participant to the plurality of options, a value for an outcome is determined by summing the ranks corresponding to options that belong to that outcome. Thus, the influent function is defined as:

$$\Phi(O) = \sum_{a \in O} \Phi(a) \quad (1)$$

In another instance, a participant may provide a ranked list of the options. This means that a participant may create an ordered list that specifies the participant's most preferred option, the participant's second most preferred option and so on. If #(a) is the rank number of an option a and n is the total number of options, then an influent function φ(a) is defined as:

$$\Phi(a) = 1 - \frac{\#(a)}{n} \quad (2)$$

Sometimes, an influent function is needed to map an option or an outcome not onto a single value of $\mathbb{R}$, but to a range within $\mathbb{R}$. This might occur in situations where one of the characteristics associated with an option or an outcome is a number that can fall within a range. For example, the amount of support for purchasing an item might vary depending on the price characteristic. That is, the support might be a function of the price. These ranges may be referred as $\{c[in]\} \subset \mathbb{R}$ to $\{c[out]\} \subset \mathbb{R}$ where $\{c[in]\}$ is the range associated with the characteristic, $\{c[out]\}$ is usually the range for voting that is selected. c* is a characteristic function mapping $\{c[in]\}$ to $\{c[out]\}$ for the characteristic of an option or an outcome.

Figure 4:
FIG. 4 is a partial screen shot of a user interface showing a ranking of issues and options for an influent function.

In some embodiments, a participant may rank the issues and the options to create an influent function associated with the participant. FIG. 4 illustrates an example ranking of the issues and the options by a participant. Referring to FIG. 4, "Gymnasium", "Art Gallery", "Performance Space", and "Municipal Offices" represent four issues. Each of these issues further includes two or more options. As shown in FIG. 4, "No Gym", "Small Gym", and "Large Gym" are options associated with the issue "Gymnasium". A participant may assign a level of support or importance for the options and issues by assigning a rank to each option and issue, as illustrated in FIG. 4. In some embodiments, if a survey participant does not indicate a specific ranking for an option, then a processor of the survey-conducting server (or the collective outcome-generating server) may complete the influent function for the survey participant (thereby determining a rank for the option that was left unspecified) so that the survey participant's response may be combined with other responses. For example, if an influent function Φ' is undefined on an option a we can define P={φ st. φ well-defined on a} and then take φ'(a)=avg{φ(a) where φ in P}.

In other embodiments, an influent function φ may be created based on the rank provided by a participant associated with the plurality of outcomes, wherein that influent function is not expressed as an influent function associated with the plurality of options. If a participant modifies or merges that influent function φ based on one or more issues or otherwise applies adjustments using methods that require the influent function to be expressed as an influent function associated with options, then an influent function φ' can be found wherein $\Sigma_{O \in O'}|\phi(O)-\Sigma_{a \in O}\phi'(a)|$ is minimized, and φ' may be adjusted using those same methods to create a new influent function $\phi'_{new}$. Based upon the effect of the adjustments applied to φ', a new influent function $\phi_{new}$ based on φ may be created such that $\phi_{new}=\phi*(\phi'_{new}/\phi')$. Modifying and merging influent functions to create other influent functions is explained in further detail below.

Given an issue domain U', the influent function generated as a result of ranking the plurality of options and the one or more issues is given by:

$$\phi(a)=w(u(s,a)* \ldots *w(u(1,a))*R(a) \quad (3)$$

where R(a) is the rank given by a participant to an option a, u(i, b) is the set u in $U_i$ such that b∈u, and w(u(i, b)) is the rank or weight given to u(i, b). In a scenario, w(u(i, a))=w(u(i, b)) if option a and option b belong to the same issue. In this case, w(u) is the weight of that issue. Generally, a set of weights w(u) for issues is determined such that: 0≤w(u)≤1, for all issues, and where, $$1 = \sum_{u \in U} w(u) \quad (4)$$

for each issue u in closed issue set U. In other words, issue weights are expressed as percentages that add up to 100% for each issue set.

Figure 5:
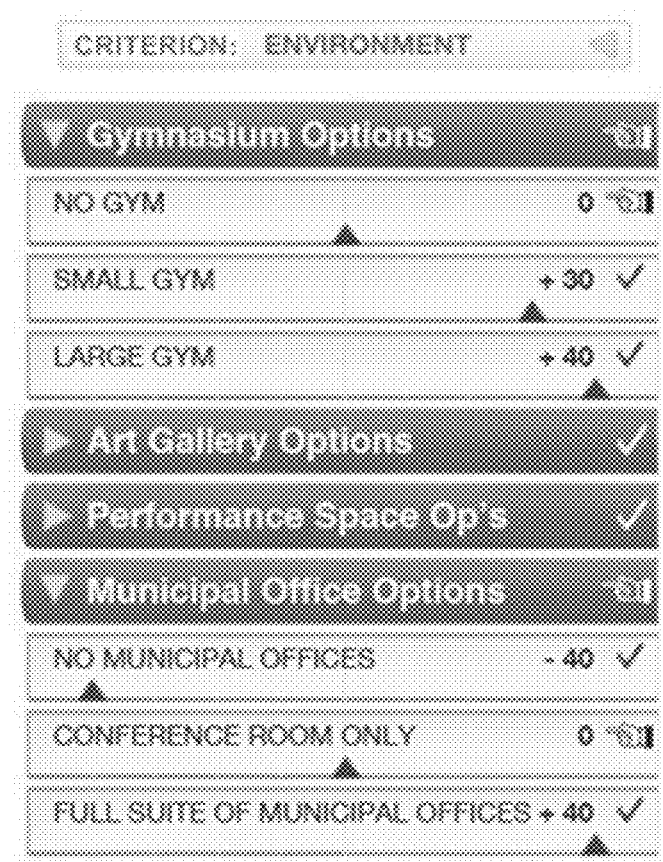
FIG. 5 is a partial screen shot of a user interface showing a ranking of issues and options, based on a criterion, for an influent function.

In other embodiments, a participant may rank the issues and the options associated with each survey based on one or more criteria. The criteria may be defined by the survey administrator(s) and/or the survey participants. The criteria may consist of defined values in particular embodiments. FIG. 5 shows an example ranking of the issues and options of a survey based on a criterion (or value). In the illustrated example of FIG. 5, participants rank the options and issues by considering the criterion "Environment". For example, a participant may rank the issue "Gymnasium" by considering what impact a Gymnasium may have on the environment. If the participant believes that a Gymnasium may adversely affect the environment in some way, the participant could show relatively less support for a gymnasium by assigning a lower rank to the issue "Gymnasium". Similarly, each issue and its corresponding options may be ranked by the participant according to this criterion. More than one criterion may be provided to the participants. For example, a second criterion "Cultural Impact" may also be defined for the participants. Each participant then ranks the issues "Gymnasium", "Art Gallery", "Performance Space" and "Municipal Offices" and the corresponding options based on the impact they may have on the criterion "Cost".

When a participant ranks the issues and options based on a criterion, an influent function is generated for that participant for the survey. In some cases for each different criterion, a new influent function may be generated for the participant. Thus, a participant may be associated with a plurality of influent functions wherein the number of influent functions corresponds to the number of criteria. A participant may publish one or more of these influent functions to be used by other participants (such influent functions may be stored in an influent functions repository 129 as shown in FIG. 1).

In other embodiments, an influent function $\phi_1$ corresponding to a ranking of issues and options for issue domain $U'_1$ over the set of options A may be converted into an influent function $\phi_2$ corresponding to a ranking of issues and options for a different issue domain $U'_2$ over the same set of options A. Take V={$\phi_1, \ldots, \phi_n$} as the set of influent functions associated with issues and options for issue domain $U'_2$ such that $\phi_1(a)=\phi_i(a)=w_i(u(s, a))* \ldots *w_i(u(1, a))*R_i(a)$ for all the options a in A, where 0≤w(u(j, a))≤1 for all j, and then choose $\phi_2=\phi_i$ in V such that ({max{$R_i(a)$, a∈A}−min{$R_i(a)$, a∈A}}) is minimized.

In some embodiments, ranks for issues and options may be recommended to a participant based on a trusted advisor. In particular embodiments, to build a network of trusted advisors, participant accounts may be created for each participant in a social network. The participant accounts may then be approved by a survey administrator and appropriate permissions assigned to each participant. Thereafter, participants are allowed to share information such as maps, reports, plans, images, videos, comments, etc. to influence the other participants. In the social network, a participant may assign trust ranks to one or more other participants according to how much confidence the participant has in their decisions in different areas. Trust ranks may be allocated according to issue, so for example, a participant could give a high trust ranking on scientific decisions to a friend who is an engineer. For example, Joe may know Sam personally and feels that Sam's views are similar to his own. Hence, Joe may assign a high trust ranking for Sam. However, if Joe feels that Sam's views on only certain issues match his own, then Joe may assign a high trust ranking to Sam for only those issues. Similarly, Sam may in turn assign a trust rank to Fred. In this example, since Joe has assigned a high trust ranking for Sam since they share the same views, Sam's ranking of issues and options may be recommended to Joe when Joe ranks the issues and options.

τ(x, y) indicates the trust rank of a participant x for a participant y and $\tau_u(x, y)$ is the trust rank provided by participant x to participant y over an issue u.

To recommend ranks for issues or options to a participant, other participants who the participant has not directly assigned a trust rank to may also be considered. In this case, a participant may specify a trust propagation factor. The trust propagation factor Π(x) for a participant x describes the maximum length of the chain of participants between the participant x and a participant y that is to be relied on as a basis of trust. Here, the length of the chain includes both participant x and participant y. For example, Π(x)=2 means participant x and participant y are directly connected as there are only two participants in the chain. Π(x)=3 means that participant x and participant y are connected via one intermediary participant.

Trust propagation factor Π may be used to determine how much the trust rank of a participant for another participant changes if the other participant is not known to the participant but is connected to the participant by one or more degrees of separation through intermediary participants. Referring to the previous example, although Joe did not provide a trust rank for Fred, he provided a trust rank for Sam who in turn provided a trust rank for Fred. A trust rank of Joe for Fred may be determined based on the trust propagation factor and the trust rankings provided by Joe to Sam and provided by Sam to Fred.

A trust pathway P'(x, y) from participant x to participant y is defined as a series of participants linked by trust ranks P'(x, y)={$P_1, P_2, \ldots P_n$} is a subset of P where x=$P_1$ and y=$P_n$ and τ($P_i, P_{i+1}$) for all 1≤i≤n−1 is received. P°(x, y) is a valid trust pathway between the participant x and the participant y represented by the following equation:

$$P°(x,y) = \text{the set } \{P'(x,y) \text{ such that } P'(x,y) \in P°(x,y) \text{ then } |P'| \leq \lambda(x)\} \quad (5)$$

In addition to the trust propagation factor, a trust decay factor may also be defined. The trust decay factor is a measure of rate at which the trust between a participant and another participant decays as degree of separation between the two participants increases. The degree of separation between a participant and another participant is the number of participants which connect the participant and the other participant. In some embodiments, the trust decay factor may be an exponential factor. Referring to the previous example, Joe and Sam are directly related therefore the degree of separation between them can be considered as minimum. However, Joe and Fred are connected indirectly with each other through Sam therefore a degree of separation between Joe and Fred is more as compared with the degree of separation between Joe and Sam. The trust decay factor defines a rate of decay in trust for each degree of separation between participants.

Based on the trust pathway information, a trust ranking can be recommended to participant x for participant y. To begin with, the trust rankings are normalized such that the most trusted participant has a value '1'. The normalized trust ranking τ'(x, y) is given by:

$$\tau'(x, y) = \frac{\tau(x, y)}{\tau(x, y')} \quad (6)$$

where y∈P and τ(x, y)=max{τ(x, y) for all y∈P}

The trust ranking recommended to participant x for participant y is determined by:

$$\tau(x, y, P°(x, y)) = \sum_{P' \in (x,y)} \frac{\pi(x) - |P'|^{\Delta(x)}}{\pi(x)} * \prod_{P_i, P_{i+1} \in P'} \tau'(P_i, P_{i+1}) \quad (7)$$

where Δ(x) represents a trust decay factor associated with a participant x.

In the above equation, the first part represents the trust decay factor and the second part represents the trust propagation factor. The trust decay factor and the trust propagation factor are added up over all the valid trust pathways from x to y.

In some embodiments, rankings for an issue or option may be recommended to a participant based on the recommended trust rankings. A recommended rank for the participant x for an option a, $R_o$(a, x), may be determined by:

$$R°(a, x) = \frac{\sum_{y \in P^v} \tau(x, y, P°(x, y)) * R(a, y)}{\sum_{y \in P^v} \tau(x, y, P°(x, y))} \quad (8)$$

where R(a, y) is the rank provided by the participant y to the option a. $P^V$ is a subset of P where $P^V$ includes $P^V$(a) and $P^V$(u) which represents the set of participants that ranked the option a and the issue u respectively.

Similarly, a recommended rank or weight W°(u, x) for an issue u may be determined by the following equation:

$$W°(u, x) = \frac{\sum_{y \in P^v} \tau(x, y, P°(x, y)) * W(u(y))}{\sum_{y \in P^v} \tau(x, y, P°(x, y))} \quad (9)$$

Additionally, the confidence of a recommended ranking for an option a may be determined by evaluating the standard deviation of the recommendations as given below:

$$C(R°(a, x)) = \sqrt{\frac{\sum_{y \in P^v} \tau(x, y, P°(x, y)) * |R(a, y) - R°(a, x)|^2}{\sum_{y \in P^v} \tau(x, y, P°(x, y))}} \quad (10)$$

Similarly, the confidence of a recommended weight to an issue u may also be determined.

In some embodiments, trust ranks may be recommended based on historical data. Previous voting patterns may be checked to identify other participants who have voted similarly to the participant and based on this information a trust rank for the other participants may be recommended to the participant. A recommended historic trust rank $\tau^h$(x, y, a) is provided by a participant x to a participant y related to option a. A historic decision series D"={D(1), D(2), . . . , D(n)} may be referred to for suggesting the recommended historic trust rank to the participant y. $A_i$(x, y, a) is a set of options that may be considered for suggesting the recommended historic rank to the participant y, wherein $A_i$={$a_1, a_2, \ldots, a_n$} ⊂ D(i), where D(i) contains all voting information for all participants.

In calculating a historic trust recommendation for option a, the calculation can be restricted to looking at options belonging to the same issue as option a. In some embodiments, we can take $A_i$(x, y, a)={$a_j \in A_i$ such that R($a_j$, x), R($a_j$, y)≠∅} where R($a_j$, x) is a rank provided by the participant x to an option $a_j$ in a decision D(i) in D"; and R($a_j$, y) is a rank provided by the participant y to an option $a_j$ in a decision D(i). Therefore, the recommended historic trust rank for the participant y by the participant x is determined by:

$$\tau^h(x, y, a) = 1 + \left\{ \frac{\sum_{b \in A(x,y,a)} |R(b, x) - R(b, y)|}{\|A(x, y, a)\|} \right\}^{-1} \quad (11)$$

In some embodiments, we can take a measure of semantic proximity between two options Prox(a, b), for example where $$Prox(a, b) = \frac{\|\{u \text{ s.t.} a \in u \text{ and } b \in u\}\|}{\|\{u\}\|}$$

for all issues u in a set of issue domains. In such a case the recommended historic trust rank would be:

$$\tau^h(x, y, a) = \left\{ 1 + \frac{\sum_{b \in A(x,y,a)} Prox(a, b)|R(b, x) - R(b, y)|}{\sum_{b \in A(x,y,a)} Prox(a, b)} \right\}^{-1} \quad (12)$$

Thereafter, based on the recommended historical trust rank suggested to participant x for the other participants, a recommended historic rank $R^h(a, x)$ is determined for participant x for option a as:

$$R^h(a, x) = \frac{\sum_{y \in P^v(a)} \tau^h(x, y, a) * R(a, y)}{\sum_{y \in P^v(a)} \tau^h(x, y, a)} \quad (13)$$

where $P^v(a)$ is the set of participants that voted on the option a.

Additionally, a confidence rating of the recommended historic rank $R^h(a, x)$ for participant x for option a may be given as:

$$C(R^h(a, x)) = \sqrt{\frac{\sum_{y \in P^v(a)} \tau^h(x, y, a) * |R(a, y) - R^h(a, x)|^2}{\sum_{y \in P^v(a)} \tau^h(x, y, a))}} \quad (14)$$

In a similar manner, a recommended historical trust rank can be found for an issue, and a confidence rating associated with that historical trust rank.

In some embodiments, information that is relevant to determining trust rankings (including the historical information discussed above) may be saved in a trust information database and accessed by processor 120 of FIG. 1's survey conductor 102 to automatically determine trust rankings among participants.

Figure 6:
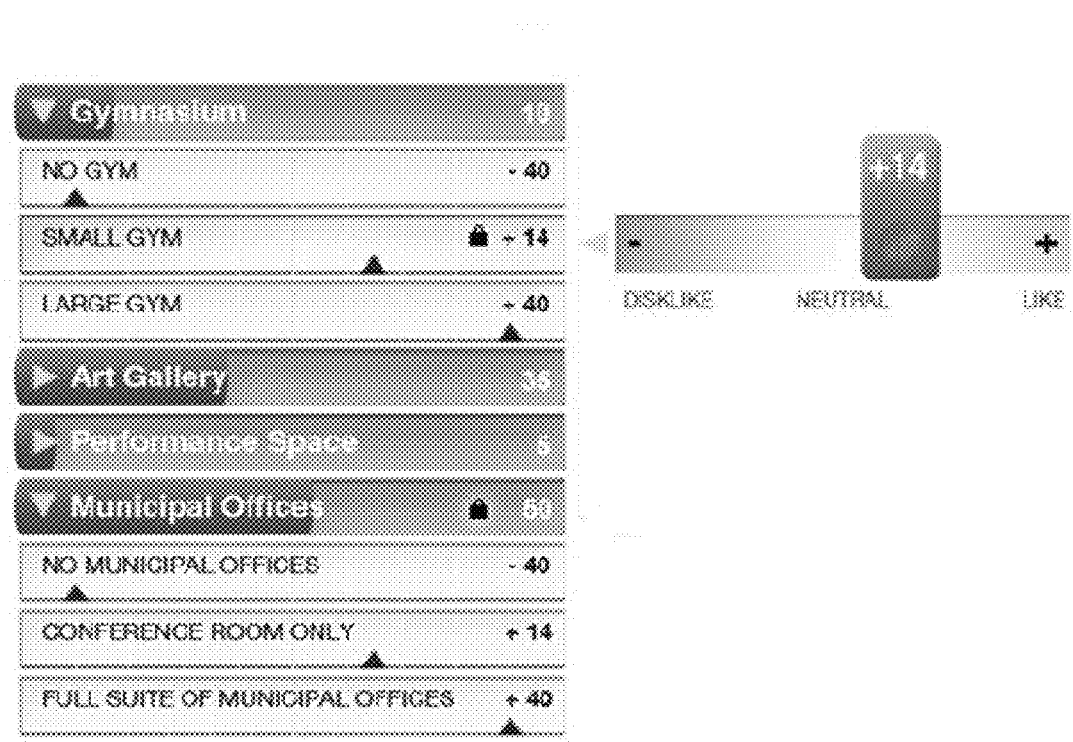
FIG. 6 is a partial screen shot of a user interface showing the modification of an influent function by varying a rank or weight associated with an option.
Figure 7:
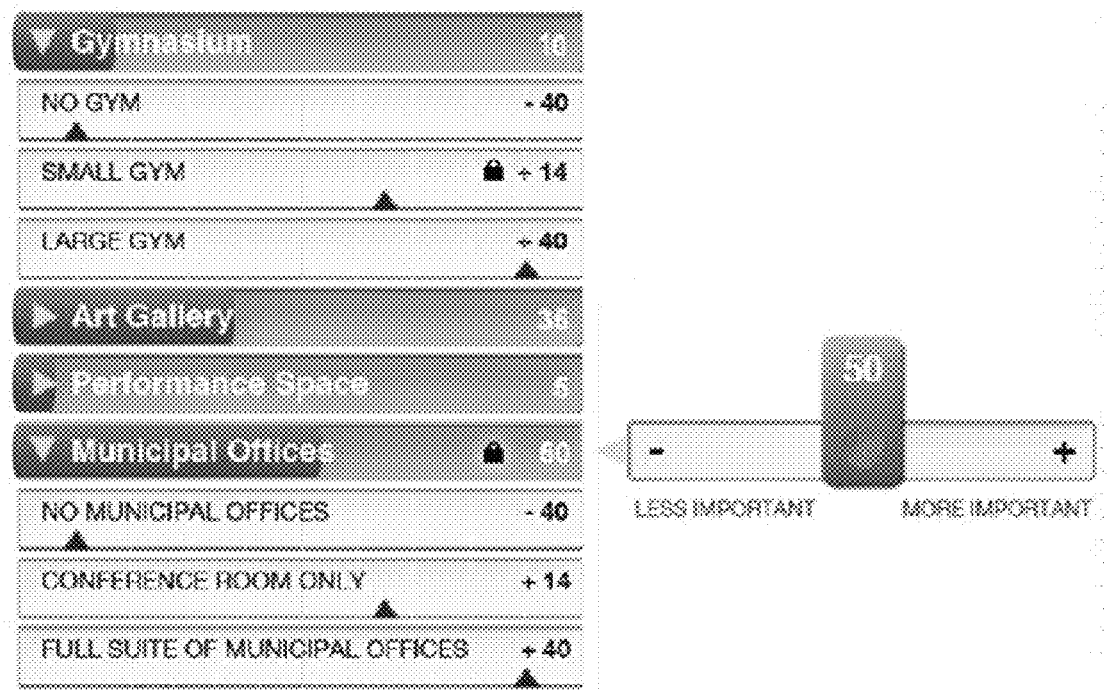
FIG. 7 is a partial screen shot of a user interface showing the modification of an influent function by varying a rank or weight associated with an issue.

In addition to directly ranking the issues and options associated with each survey to create one or more influent functions for the survey, a participant may create a new influent function for a survey by modifying one or more existing influent functions associated with the survey. The influent functions associated with the survey may consist of influent functions created by other survey participants. A participant may choose one or more influent functions and modify the ranks associated with one or more of the issues and options of the chosen influent functions to create one or more new influent functions for the participant. It is to be noted here that the original influent functions created by the other participants are left intact to be used by another participant. FIG. 6 shows an example modification of an influent function by varying a rank or weight associated with an option (i.e. the "small gym" option in FIG. 6). Similarly, FIG. 7 illustrates an example of modifying an influent function by varying a rank or weight associated with an issue (i.e. the "municipal offices" issue in FIG. 7). In this way, a participant can restrict an influent function to a specific issue by making the rank of that issue '1' and making the ranks of other issues '0'. Thus, if there are five issues, a participant could possibly create five influent functions, each one corresponding to the original influent function restricted to an issue.

Figure 8:
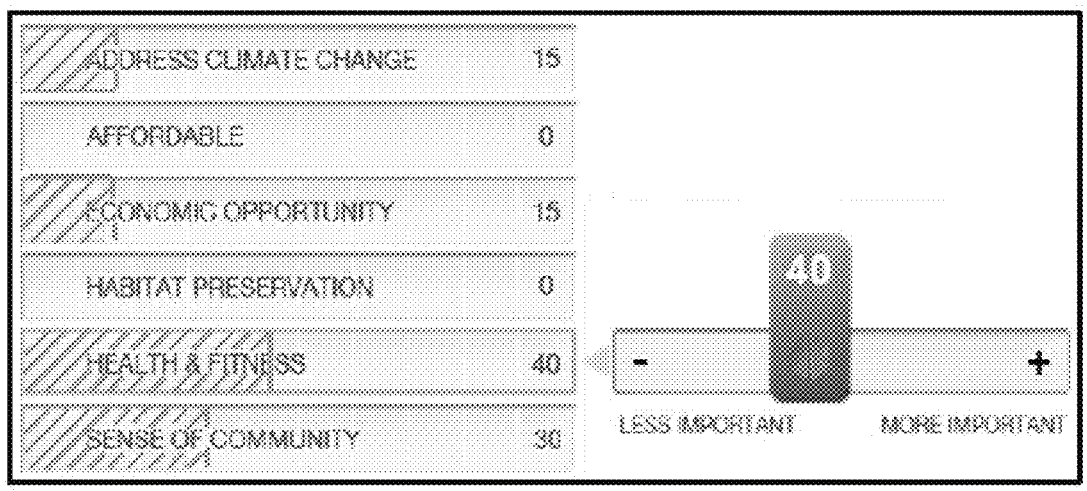
FIG. 8 is a partial screen shot of a user interface showing the merging of influent functions.

In yet another embodiment, a participant may create an influent function for a survey by merging two or more influent functions associated with the survey. The influent functions may be associated with other survey participants. In this case, the influent functions may be considered as starting influent functions. FIG. 8 shows an example merging of a plurality of influent functions. In FIG. 8, the influent functions happen to be values (i.e. "address climate change", "affordable", "economic opportunity", "habit preservation", "health & fitness" and "sense of community"), where the influent functions for each value have been predefined (either by the survey participant himself or by other users). Merging the starting influent functions involves assigning a weight to each of the influent functions and combining them to form a single influent function. A survey participant 105 may use a GUI control provided by participant survey interface 108 of FIG. 1 to select two influent functions and assign the desired weights to the influent functions. Processor 120 of survey conductor 102 then executes merge functions routine 124C to merge the selected influent functions to generate a new influent function.

More particularly, given the starting influent functions $\Phi^* = \{\Phi_1, \ldots, \Phi_m\}$, a participant can integrate them into a single function by assigning a relative weight $K = \{k_1, \ldots k_m\}$ to each starting influent, given by I (K, $\phi^*$). I(K, $\Phi^*$) is the sum of the starting influent functions $\Phi^* = \{\Phi_1, \ldots, \Phi_m\}$ and weights $K = \{k_1, \ldots k_m\}$, given by: I (K,$\phi^*$)=$\Sigma_{1 \le i \le m} k_i * \phi_i$. In some embodiments, the component influent functions $\Phi_i$ in $\Phi^*$ may be divided by their magnitude $\|\Phi_i\| = \Sigma_{O \in O} \phi(0)$ in order to satisfy the condition $\|\Phi i\| = 1$.

Assuming there are a number of starting influent functions of the form:

$$\phi_i(a) = w_i(u(s,a))^* \ldots * w_i(u(1,a))^* R_i(a),$$

then the starting influent functions are merged using the above process to find:

$$\phi(a) = \Sigma_{1 \le i \le m} k_i * \phi_i(a),$$

for all a. Two approaches may be used to represent this in the form:

$$w(u(s,a))^* \ldots * w(u(1,a))^* R(a):$$

In a first approach, w(u(j, a)) is defined as:

$$w(u(j, a)) = \frac{\sum_{1 \le i \le m} k_i * w_i(u(j, a))}{\sum_{1 \le i \le m} k_i}$$

Further, R(a) is defined as:

$$R(a) = \frac{\Phi(a)}{\prod_{1 \le j \le s} w(u(j, a))}$$

$\phi(a)$ is then calculated as:

$$\phi(a) = w(u(s,a))^* \ldots * w(u(1,a))^* R(a).$$

In a second approach, w'(u(j, a)) is defined as the weighted average by:

$$w'(u(j, a)) = \frac{\sum_{1 \leq i \leq m} k_i * w_i(u(j, a))}{\sum_{1 \leq i \leq m} k_i}$$

Similarly, R'(a) is defined as:

$$R'(a) = \frac{\sum_{1 \leq i \leq m} k_i * R_i(a)}{\sum_{1 \leq i \leq m} k_i}$$

Thereafter, V is defined as the space of solutions for $\{\Delta w(u(i, a), \Delta R(a)$ for $\forall a \in A\}$ that satisfy the following equation:

$$[w'(u(s, a)) + \Delta w(u(s, a))] * [w'(u(s-1, a)) + \Delta w(u(s-1, a))] * \quad (15)$$
$$\ldots * [w'(u(1, a)) + \Delta w(u(1, a))] * [R'(a) + \Delta R(a)] = \Phi(a),$$
$$\text{for } \forall a \in A$$

where $\phi(a) = \tau_{1 \leq i \leq m} k_i * \overline{\phi}_i(a)$, with the condition that w(u(i, a))=w(u(i, b)) if option a and option b belong to the same issue, and that the sum of the weights of issues in an issue set is 100%.

Thereafter, computational methods such as linear programming and numerical approximations are used to determine v in V such that:
$\Sigma_{1 \leq i \leq m} |\Delta R_i(a)|$ is minimized. If there is more than one solution, then a random solution may be chosen or further computational methods may be used to choose v such that:
$\Sigma_{1 \leq i \leq m} |\Delta w_i(u(j, a))|$ is minimized. If there is more than one solution, then a random solution may be chosen.

In some embodiments, a participant may vary a weight associated with the two or more influent functions based on a trust rank associated with each participant associated with the influent functions or a trust rank associated with issues associated with the influent functions. Moreover, the merging of the two or more influent functions may be based on different trust ranks corresponding to different issues, wherein the trust ranks are associated with the expertise of a participant for that issue. A trust rank associated with a participant may be determined as explained earlier.

In other embodiments, for the case when influent functions are created by ranking the issues and options based on one or more criteria, a participant may merge two or more such influent functions associated with one or more other participants based on a trust rank associated with each of the other participants. Here, the trust rank may be based on a level of expertise associated with each of the other participants for a criterion. For example, if John had previously created an influent function by ranking the options associated with the issue "Gymnasium" based on a criterion "Environment", Jim may use the influent function created by John along with one or more influent functions created by other participants with respect to the options associated with "Gymnasium" based on the criterion "Environment" to be merged into an influent function for Jim associated with that criterion. Now, if John happens to be an environmental expert, then Jim may assign a higher trust rank to John for the criterion "Environment" such that a greater weight is given for John's views regarding environmental impact of the options associated with a gymnasium. Similarly, Jim may assign different trust ranks to different other participants for various criteria with respect to different issues depending on the expertise of the different participants for the various criteria and issues. In yet another embodiment, trust ranks may be recommended to a participant by considering not only the trust propagation factor and the trust decay factor but also the expertise of other participants related to the criteria.

In a further embodiment, a participant may create a new influent function (or generate an ordinally ranked list of the potential outcomes) based on one or more existing influent functions associated with the participant and one or more potential outcomes chosen for the participant. For example, the participant may initially create one or more influent functions for a survey by ranking the issues and options, ranking the issues and options based on one or more criteria, modifying one or more existing influent functions, and/or merging two or more existing functions as explained above. Based on the influent functions created by the participant, each potential outcome for the survey (corresponding to a particular combination of options) may be automatically ranked by a processor in accordance with predefined software routines which receive as input the participant's influent functions. The potential outcomes and corresponding rankings are presented to the participant. For each outcome, the participant may confirm or change the order in which that outcome has been automatically ranked. For example, the participant may provide a rank '1' to the top ranked potential outcome that was presented as a result of the automatic ranking of the potential outcomes if the participant agrees that the top ranked potential outcome is indeed his most preferred outcome. If the top ranked potential outcome is not the preferred outcome for the participant then the participant may choose another outcome from the list of potential outcomes and assign that potential outcome a rank '1'. Similarly, the participant may assign a rank '2', a rank '3', etc. to potential outcomes in the list of ranked potential outcomes to indicate his second preferred outcome, his third preferred outcome and so on.

If $O_1, O_2, \ldots O_j$ is the list of potential outcomes ranked by the participant, then for outcome $O_1$, an equation can be generated as:

$1 = \Sigma_{is.t.a_i \in O_1} r_i$, where each $r_i$ is some unknown variable in $\mathbb{R}$ corresponding to the option $a_i$ in $O_1$.

For potential outcome $O_2$, an equation can be generated as:

$1 - \Delta_1 = \Sigma_{is.t.a_i \in O_2} r_i$, where $\Delta_1 > 0$ using some of the $r_i$ from the equation for $O_1$ and some new ones from $O_2$.

If the participant provides a third preferred potential outcome $O_3$, then an equation for $O_3$ is given by:

$1 - \Delta_2 = \Sigma_{is.t.a_i \in O_3} r_i$, where $\Delta_2 > \Delta_1$.

This process of generating equations may be continued for however many potential outcomes the participant ranks. If the participant ranks n outcomes, then n simultaneous equations are generated.

O' is defined as the set of $a \in \{O_1 \cup O_2 \cup \ldots \cup O_n\}$. s=|O'|

Since there are n−1 variables $\Delta_i$, there are n equations with s+n−1 variables. Further, there are n−1 inequalities of the form $\Delta_1 > 0$ and $\Delta_{i+1} > \Delta_i$. This gives a subset V of $R^{s+n-1}$ comprised of vectors $\{r_1, r_2, \ldots r_n, \Delta_1, \ldots, \Delta_{n-1}\}$ where $r_i=0$ if $a_i \notin O'$. This represents the space of possible solutions to the n simultaneous equations.

If V is empty, then the list of ranks provided by the participant for the potential outcomes does not support creation of an influent function. In this case, the participant may be provided the option of eliminating the last ranked potential outcome on the list and trying again. This may be repeated until a non-empty V is obtained. If V is not empty, an influent function may be chosen from the influent functions in V by taking $mid(r_i)$ and $mid(\Delta_j)$ as the median value from the range of solutions for each variable and finding the vector $V'=\{r_1', r_2', \ldots r_s', \Delta_1', \ldots, \Delta_{n-1}'\}$ in V such that: $\Sigma|r_i'-mid(r_i)|+\Sigma|\Delta_i'-mid(\Delta_i)|$ is minimized. If there is more than one such vector, then a further stipulation that: $\Sigma_{r_i \in V} \Sigma_{r_j \in V}|r_i-r_j|$ is minimized may be added and then a vector may be chosen randomly. Thereafter, an influent function is defined as $\phi^P$ where $\phi^P(a_1)=r_i'$.

According to some embodiments, influent functions for a participant may be created using rules. Rules are ways of building influent functions using defined functions. These functions take characteristics and characteristic functions associated with the options and outcomes, as well as other influent functions, to create another influent function. For example, a rule-based influent function may represent a total cost of a date. The choices might be (a) which restaurant (b) which theatre and (c) what transportation in between. The cost of the date may depend on not just the restaurant or movie theatre, but also how much it will cost to travel in between if both a restaurant and a movie theatre are chosen. The cost to travel might in turn depend on the choice of transportation, which depends on which restaurant and theatre is chosen. Rules are ways of expressing more complicated relations which can be entered as formulas.

Rules can express inequalities or Boolean statements which can lead to different functions if satisfied or not satisfied. Rules can be defined by survey participants and/or survey administrators. Rules can be used to create influent functions from scratch, or modify an existing influent. For example, a survey participant may take a certain influent function as his starting point, but create a rule which zeros the support for any outcome in which the budget exceeds a certain spending threshold. It might also be used as a multiplier or power function which affects the total support for an outcome based on certain characteristics.

In some embodiments, influent functions associated with survey participants may be included in a library of influent functions which serves as a repository of influent functions. The influent functions stored in the repository may include influent functions created by any one of the methods described herein, including: ranking options, ranking issues and options, ranking issues and options based on one or more criteria or values, modifying one or more influent functions, merging two or more influent functions, using one or more starting influent functions associated with the participant and one or more potential outcomes determined based on the influent functions, and using rules. The library of influent functions may be accessed by a participant to select one or more starting influent functions and further perform operations such as modifying the influent functions, merging the influent functions, ranking potential outcomes based on the starting influent functions, and using rules to modify and/or create new influent functions based on the starting influent functions. The repository of influent functions may be populated over time with influent functions created by survey participants. These influent functions may then be presented to other survey participants as starting influent functions. Each survey may have a corresponding repository of influent functions.

A participant profile may be associated with each participant. For example, survey conductor 102 of FIG. 1's system 100 incorporates, or has access to, a participant profile database 119 for storing information related to each participant's profile; such information may be used by survey conductor 102 and/or collective outcome generator 104 to determine influent functions, influent levels, satisfaction scores, dissonance scores, and other variables for each survey. The participant profile may be populated as the participant completes each survey. The participant profile may record information such as information relating to the participant's survey experiences and responses and the participant's influent level for the survey. For example, a participant profile may include one or more of the following, for each survey: the participant's final influent function(s), a satisfaction score and/or dissonance score of the participant with respect to the survey's collective outcome, an influent level of the participant, and a weight assigned by the participant to the survey. To begin with, at time $t_1$, the participant profile for a participant may include an influent level associated with the participant for a decision $D(t_1)$ and a weight or "impulse" assigned by the participant to the decision $D(t_1)$.

The influent level associated with a participant for each survey is the weighing factor accorded to the participant's one or more influent functions that constitute that participant's "vote" for the survey. For example, in a democratic process all participants may be considered to have equal say or equal influence in deciding the collective outcome or decision, and a weighing factor of 100% is thus assigned to each participant. However, a democratic process that assigns all participants an equal influence towards a decision may not always be desirable or feasible. For example, in the case of a Parliament, there could be five political parties with 40%, 31%, 19%, 6% and 4% of popular support respectively. In this case, the political parties could be assigned influent levels of 40, 31, 19, 6 and 4 respectively. This means the political parties' votes are weighed by a factor 40%, 31%, 19%, 6% and 4% respectively. The influent level associated with a participant may be assigned by a survey administrator and/or by the survey participants.

The influent level of a participant x is referred to as $\theta(x)$. The influent level of participant x can also vary depending upon the time or decision, in which case we can write $\theta(D(t), x)$ as the influent level for the decision at time t. The influent level of participant x may vary depending on the outcome. For example, the influent level for outcome O may be the percentage of options belonging to O for which participant x provided a rank. We refer to the influent level of participant x for outcome O as $\theta(O, x)$.

In addition to the influent level associated with a participant for a survey, the participant profile may also include a weight assigned by a participant for a survey. The weight assigned by a participant to a survey indicates a level of importance given by that participant for the survey. A participant can give a rank $J(D(t), x)$ to a decision as a way of indicating its importance relative to other decisions in the series of decisions. The rank $J(D(t), x)$ where $0 \leq J(D(t), x) \leq 1$, may be called the impulse of x for $D(t)$.

The impulse assigned by the participant to each survey may be used to determine the participant's satisfaction or dissonance for the survey as will be explained below.

Each participant may create or select one or more influent functions in the manner described above. If more than one influent function is developed then the participant may select a subset of these influent functions to contribute toward the participant's "vote" toward a collective decision. The selected influent functions may be combined to create a new influent function for the participant corresponding to the participant's vote. The selected influent functions may be combined using one or more of the techniques described above for merging together influent functions. The new influent function corresponding to the participant's vote and/or the influent functions created by the participant may be published by the participant for use by other participants.

After the survey participants have cast their vote, at step 306 of FIG. 3's method 300 the influent functions of the participants are aggregated and applied to each potential outcome to determine a collective influent function for each survey, as described in further detail below. This step may be performed by one or more components of FIG. 1's system 100 or FIG. 2's system 200. For example, the processing at method 300's step 306 may be carried out by collective outcome generator 104 of system 100 (FIG. 1). A processor 112 of collective outcome generator 104 may be operated to call software routines 114 stored in a program memory 116 accessible to processor 112. The influent functions of the survey participants, which may be stored in a survey results database 118, may be provided as input to one or more of the software routines 114 that are called by processor 112. The influent functions may be used to determine satisfaction scores and dissonance scores as explained herein. Execution of the software routines 114 by processor 112 causes the processor 112 to generate and return a collective influent function for the survey.

As noted above, the generation of a collective influent function for a survey may take into consideration satisfaction scores and/or dissonance scores associated with each potential outcome for the survey. The satisfaction score of a potential outcome represents a participant's degree of satisfaction with that outcome. The satisfaction score may be indicative of the amount of intentional energy that a participant would put towards realizing that outcome. The satisfaction score Sat' can be expressed as a percentage of potential energy available. In particular embodiments the satisfaction score for each outcome is derived from the final influent function (as determined from the participant's rankings of issues and options). Application of the final influent function to the potential outcomes generates a ranked list of the potential outcomes, wherein the top ranked outcome is the one that would provide the greatest satisfaction to the participant and therefore has the highest satisfaction score.

In other embodiments, the participant's satisfaction score may be based on a modified ranked list of the potential outcomes submitted by the applicant. In such cases, each potential outcome may first be automatically ranked in accordance with the participant's final influent function as discussed above, but the participant is allowed to modify the order in which the outcomes are ranked. The participant may view the pre-ranked list and confirm or change the order by manually ranking one or more of the potential outcomes as the most preferred potential outcome, a second most preferred outcome and so on. In some embodiments, ranks for the potential outcomes may have been recommended to the participant by recommending ranks for issues and/or options as discussed earlier (e.g. as may be recommended when ranking by value or trusted advisor).

A participant's satisfaction score for the collective outcome determined for a survey may be saved in the participant profile of the participant (and stored in participant profile database 119 of FIG. 1) to determine an influent level associated with the participant for a subsequent survey as explained later. Thus, as and when each survey is conducted, the participant profile of a participant is updated to include the participant's satisfaction score for that survey's collective outcome.

If $R(O, x)$ is the rank assigned to a potential outcome O for a participant x and corresponds to an influent function $\phi(O)$ in the unit form, that is, $R(O, x) = \phi(O)$ and $\|\phi\| = 1$, then, $Sat'(O, x)$ represents the satisfaction of participant x for outcome O and is expressed as:

$$Sat'(O, x) = \frac{(R(O, x) - \text{Min}R(x)) * (1 - 2\Delta)}{\text{Max}R(x) - \text{Min}R(x)} + \Delta \quad (16)$$

where $\text{Max}R(x) = R(O, x) \text{ s.t. } O \in O^a$ and $R(O, x) \geq R(O, y) \forall y \in P, x \neq y$ ($\text{Max}R(x)$ corresponds to the greatest rank provided by participant x for any of the outcomes); $\text{Min}R(x) = R(O, x) \text{ s.t. } O \in O^a$ and $R(O, x) \leq R(O, y) \forall y \in P, x \neq y$ ($\text{Min}R(x)$ corresponds to the smallest rank provided by participant x for any of the outcomes); and $\Delta$ is some very small number, e.g. 0.0001. If $\text{Max}R(x) = \text{Min}R(x)$ then $Sat'(O, x) = 0.5$ is taken.

If the satisfaction function is considered over the space of all possible outcomes, a way of applying equality and preventing strategic ranking is to require that the volume displaced by the satisfaction function be the same for all participants. A way of thinking about this is to imagine an automated bidding system, which helps each participant to place a price and bid on each potential outcome, where the amount of each bid is based on how much the participant values that outcome relative to the other outcomes. Normalizing the final influent function associated with each participant ensures the total amount bid by each participant over all the outcomes is the same, while preserving the relative rankings of the outcomes and ensuring that $0 < Sat(O, x) < 1$ for all outcomes and all participants. $Sat(O, x)$ defines the normalized satisfaction for a participant x and is given by:

$$Sat(O,x) = Sat'(O,x)^{P^x} \quad (17)$$

where $P^x$ is the exponential modifier for each function that normalizes it to a constant volume while respecting the relative rankings of the outcomes and keeping the result between 0 and 1. $P^x$ is determined by taking $n = |O^a|$ and finding $P^x$ for each x in P such that:

$$\sum_{O \in O^a} Sat'(O, x)^{P^x} = \frac{n}{2}$$

Thus, $\sum_{O \in O^a} Sat(O, x) = \sum_{O \in O^a} Sat(O, y) = \frac{n}{2}$, for all $x, y \in P$ which basically asserts that all participants start with the same amount to spend in the bidding process.

If we are considering the survey as a decision following a set of preceding decisions $D' = \{D(i) \ldots D(j)\} \cup \mathcal{D}$, we can define $D'(O)$ as $D'$ ending with a decision to adopt outcome O, for some potential outcome O. If we are not considering previous decisions then we simply take $D'(O) = O$. The preceding decisions $D'$ might include all previous decisions, or a subset of previous decisions such as the most recent five decisions. The preceding decisions $D'$ may include some "blank" decisions $D^o$ where $Sat(D^o, y) = Sat(D^o, x)$ and $J(D^o, y) = J(D^o, x)$ for all participants x, y for decisions with few or no prior decisions. Then we can define a measure of how satisfied a participant x would be with the decision series D' that ends in decision to adopt outcome O as:

$$Sat(D'(O), x) = \frac{\sum_{i \in D'(O)} J(i, x) * Sat(i, x)}{\sum_{i \in D'(O)} J(i, x)} \quad (18)$$

where J(D(t), x) is the impulse of the participant x on the decision D(t) and Sat(D(t), x) is the satisfaction of the participant x towards a decision D(t). Further, we can define the average satisfaction of the participants for the decisions as:

$$AvgSat(D'(O)) = \frac{\sum_{x \in P} Sat(D'(O), x)}{p} \quad (19)$$

where p is the number of participants.

For each potential outcome O, we can take I(D'(O)) as the "collective satisfaction score" to represent the amount of influence behind a decision to adopt O by:

$$I(D'(O)) = \frac{\sum_{\forall x} \theta(O, x) * Sat(D'(O), x)}{\sum_{\forall x} \theta(O, x)} \quad (20)$$

On determining the satisfaction score and influent level for a potential outcome for a participant, the dissonance score associated with a given potential outcome may be determined based on one or more of: the participant's satisfaction score, the participant's average satisfaction score for all of the outcomes, the greatest rank provided by a participant to an outcome, the impulse of the participant given to the outcome, an advantage quotient associated with the outcome, a disadvantage quotient associated with the outcome, and the influent level of the participant.

In some embodiments, the dissonance score may be determined as a standard deviation of influents invested in a decision series to come up with an outcome O. Therefore, the dissonance score of the outcome may be determined based on a satisfaction score of each participant for the decision series, an average satisfaction of the plurality of participants for a decision, and an average satisfaction of the plurality of participants over the decision series. Based on the values calculated above, the dissonance score $DS_1(D'(O))$ of the outcome O is calculated by the following equation:

$$DS_1(D'(O))) = \sqrt{\frac{\sum_{x \in P} \theta(O, x) * |Sat(D'(O), x) - AvgSat(D'(O))|^2}{\sum_{x \in P} \theta(O, x)}} \quad (21)$$

A collective influent function may be defined for each outcome based on a relative weighting of the collective satisfaction scores and the dissonance scores. This relative weighting or "equality factor" may be determined by the survey administrator(s) and/or the survey participants, or it may be calculated based on assumptions about agreements between the parties. In some embodiments, the collective influent function is determined by making an assumption that none of the participants will support the most unfair outcome, even if they would benefit. This can be thought of as a social contract. To determine the collective influent function based on this assumption, a satisfaction quotient and an inequality quotient may be defined. The satisfaction quotient α is a linear factor that sets the value of the outcome which generates the most satisfaction at 1. α may be determined by taking O' in $O^a$ such that I(D'(O')) is maximum. Then, α is taken such that αI(D'(O'))=1 or α=/(D'(O'))$^{-1}$. In other embodiments, α may be determined by taking:

$$Imax = \frac{\sum_{\forall x} \theta(O, x) * \max\{Sat(D'(O), x) \text{ for all } O\}}{\sum_{\forall x} \theta(O, x)} \quad (22)$$

Then α is taken such that αImax=1, or α=1/Imax.

$\beta_1$ represents the inequality quotient. The inequality quotient is a linear factor that embodies the assumption that none of the parties will support the most unfair outcome. That is, no individual or collective effort shall be made for the outcome that is the most unequal. $\beta_1$ is determined by taking O" in $O^a$ such that $DS_2(D'(O''))$ is maximum. Then, $\beta_1$ is taken such that: $\alpha I(D'(O'')) = \beta_1 DS(D'(O''))$.

The collective influent function is the ratio of collective satisfaction to dissonance, with the relative importance of the two factors determined by the satisfaction and inequality quotients. The collective influent function represents the optimized will of the plurality of participants and is given by:

$$\epsilon_1(O) = \alpha I(D'(O)) - \beta_1 DS_1(D'(O)) \quad (23)$$

When one or more of the final influent functions include rankings based on a characteristic function c* mapping an option or an outcome characteristic to a range within $\mathbb{R}$, then $\epsilon_1(O)$ is a function mapping $\{c[in]^n\}$ to $\{c[out]^n\}$ where n is the number of such final influent functions. Extending this, if one or more of the final influent functions include rankings based on a set of characteristic functions $\{c_1^*, \ldots, c_m^*\}$ then $\epsilon_1(O)$ is a function mapping $\{c_1[in]^{n(1)}\} \cup \ldots \cup \{c_m[in]^{n(m)}\}$ to $\{c_1[out]^{n(1)}\} \cup \ldots \cup \{c_m[out]^{n(m)}\}$ where n(i) is the number of final influent functions that include rankings based on characteristic function $c_i^*$. Taking $\epsilon_1(O)$ as based on a set of characteristic functions $\{c_i^*\}$ then for each outcome, the set of values in $\{c_i[in]\}$ that maximize $\epsilon_1(O)$ is used to determine the final $\epsilon_1(O)$, and the specific values of the characteristics of that outcome. This may be done using computational methods such as linear programming and numerical approximations. This approach to determining $\epsilon(O)$ can also be used in the processes for calculating the collective influent functions below.

In other embodiments, the dissonance score may be determined as a resistance to inequality by a participant based on the resistance of the participant to satisfaction associated with one or more other participants. For a given outcome, the other participants may include one or more participants having a higher satisfaction score than the participant and one or more participants having a lower satisfaction score than the participant. The resistance of a participant to an outcome or decision may be determined based on the impulse of the participant for the decision and difference of satisfaction between the participant and the other participants.

In some embodiments, resistance of the participant to an outcome may also be determined based on a difference in the satisfaction of the participant and the other participants, an advantage quotient and a disadvantage quotient. The resistance of the participant to an outcome may indicate resistance toward other participants having higher satisfaction than the participant. The resistance of the participant to an outcome may also indicate the resistance toward other participants having lower satisfaction than the participant.

Further, dissonance of the participant to a decision in a decision series may be determined based on the influent functions of the participant for the decision of the decision series, an impulse of the participant for the decision in the decision series, the influent level of the participant, and resistance of the participant to the decision in the decision series.

In such case, the resistance of a participant x to a decision O may be determined by: $DS_2(D'(O),x)=\delta(x) Hi(D'(O),x)+\phi(x) Lo(D'(O),x)$ where $\delta(x)$ is the advantage quotient, $\phi(x)$ is the disadvantage quotient, $Hi(D'(O),x)$ is a normalized difference between the satisfaction of the participant x with one or more other participants having better satisfaction scores as compared to the participant x for a decision O and $Lo(D'(O),x)$ is a normalized difference between the participant x and one or more other participants having lower satisfaction score than the participant x for an decision O. $Hi(D'(O),x)$ is determined using the following equation:

$$Hi(D'(O), x) = \sum_{y \in Hi} Sat(D'(O), y) - Sat(D'(O), x) \qquad (24)$$

where Hi is the set of participants whose satisfaction score $Sat(D'(O),y)$ is higher than satisfaction score $Sat(D'(O),x)$ of the participant x. Similarly $Lo(D'(O),x)$ is determined using the following equation:

$$Lo(D'(O), x) = \sum_{y \in Lo} Sat(D'(O), x) - Sat(D'(O), y) \qquad (25)$$

where Lo is the set of participants whose satisfaction score $Sat(D'(O),y)$ is lower than satisfaction score $Sat(D'(O),x)$ of the participant x.

The advantage quotient $\delta(x)$ and the disadvantage quotient $\phi(x)$ for a participant x may be defined by the survey administrators and/or the survey participants. In some embodiments, $\delta(x)$ and $\phi(x)$ may be determined to be the same for all participants such that $\delta(x)=\delta(y)$ and $\phi(x)=\phi(y)$ for all x and y. In other embodiments, $\delta$ and $\phi$ may be based on empirical studies. In some embodiments, $\delta$ and $\phi$ may be determined by making one or more assumptions about agreements between the parties. Such assumed agreements might include:

Assumed Agreement I: No participant will support the most unpopular outcome. Taking O* such that some calculation of collective satisfaction such as $I(D'(O^*))$ is at a minimum, then $$Sat(D'(O^*),x)=\delta(x)Hi(D'(O^*),x)+\phi(x)Lo(D'(O^*),x) \qquad (26)$$

for all x.

Assumed Agreement II: No participant will support the most unfair outcome. Taking $O^o$ such that some calculation of dissonance such as$))DS_t(D'(O^o))$ is at a maximum, then $$Sat(D'(Oo),x)=\delta(x)Hi(D'(Oo),x)+\phi(x)Lo(D'(Oo),x) \qquad (27)$$

for all x. From equations (26) and (27) above, $\delta(x)$ and $\phi(x)$ may be calculated for each participant. In some embodiments, survey participants and/or survey administrators may provide a ratio for $\delta$ and $\phi$, and one of the assumed agreements may be used to calculate the value of $\delta$ and $\phi$.

Now, the resistance of the participant x for a decision series D' is determined as:

$$DS_2(D'(O),x)=\delta(x)H_i(D'(O),x)+\phi(x)Lo(D'(O),x) \qquad (28)$$

The dissonance score of an outcome O is determined as:

$$DS_2(D'(O)) = \frac{\sum_{\forall x} \theta(O, x) * DS_2(D'(O), x)}{\sum_{\forall x} \theta(O, x)} \qquad (29)$$

where $\theta(O, x)$ is the influent level of the participant x for an outcome O. In some embodiments, one can take $DS_2(D'(O))$ as the standard deviation of $DS_2(D'(O),x)$ as per the earlier embodiment, that is:

$$DS_2(D'(O)) = \sqrt{\frac{\sum_{x \in P} \theta(O, x) * |DS_2(D'(O), x) - Avg[DS_2(D'(O))]|^2}{\sum_{x \in P} \theta(O, x)}} \qquad (30)$$

where $$Avg[DS_2(D'(O))] = \frac{\sum_{x \in P} DS_2(D'(O), x)}{p}$$

which is a measure of fairness in the distribution of unhappiness.

As in the preceding embodiment, a collective influent function may be defined for each outcome based on a relative weighting of the collective satisfaction and dissonance scores. We may also take α as calculated in the preceding embodiment, and calculate a linear factor $\beta_2$ that embodies the assumed agreement that no collective effort shall be made for the outcome that is the most unequal. $\beta_2$ is determined by taking O in D s.t $DS_2(D'(O))$ is maximum. Then $\beta_2$ is taken such that $\alpha I(D'(O))=\beta_2 DS_2(D'(O))$.

The collective influent function $\epsilon_2(O)$ is then calculated as:

$$\epsilon_2(O)=\alpha I(D'(O))-\beta_2 DS_2(D'(O)) \qquad (31)$$

In other embodiments, the dissonance score may be determined as a deviation of satisfaction of a participant for an outcome, from the satisfaction of the participant for his ideal outcome. The ideal outcome is the outcome to which the participant has provided the maximum or highest rank. Therefore, the dissonance score for an outcome may be determined based on the participant's influent level, the participant's rank R(O, x) for the outcome, and the participant's maximum rank MaxR(x) for an outcome. The dissonance score $DS_3(D'(O),x)$ for participant x may be determined by the following equations:

$$DS_3(D'(O), x) = \sum_{i \in D'(O)} MaxR(i, x) - R(i, x) \qquad (32)$$

$$DS_3(D'(O)) = \frac{\sum_{x \in P} \theta(O, x) * DS_3(D'(O), x)}{\sum_{x \in P} \theta(D(t), x)}$$

where R(D(t), x) is as defined above for R(O, x) as the rank by the participant x for the final outcome O of the decision D(t) in the decision series D'. Similarly, MaxR(D(t)) is defined as above for MaxR(x) as the maximum rank by a participant x for an outcome of the decision D(t) in the decision series D'.

The relative weighting of I(D'(O)) and $DS_3$(D'(O)) to define a collective influent function may be determined as above. Similarly, an inequality quotient $\beta_3$ may be determined by taking O in D such that $DS_3$(D'(O)) is maximum and then taking $\beta_3$ such that $\alpha I(D'(O))=\beta_3 DS_2(D'(O))$. These values may be used to calculate the collective influent function as:

$$\epsilon_3(O)=\alpha I(D'(O))-\beta_3 DS_3(D'(O)) \quad (33)$$

According to other embodiments, the dissonance score of a particular outcome may be determined as the difference in satisfaction between the participant in question and the other participants with respect to the outcome. The dissonance score may be determined based on one or more of: the influent level of the participant, the influent levels of the other participants, the satisfaction score of the participant, and the satisfaction scores of the other participants. For example, a dissonance score for an outcome O may be determined by:

$$DS_4(D'(O)) = \sum_{\forall x} \theta(O, x) * \sum_{\forall y} \theta(O, y) * |Sat(D'(O), x) - Sat(D'(O), y)| \quad (34)$$

The collective influent function may then be given by:

$$\epsilon_4(O)=\alpha I(D'(O))-\beta_4 DS_4(D'(O)) \quad (35)$$

On determining the collective influent function for a survey, at step 308 of FIG. 3's method 300 the potential outcomes associated with the survey are ranked based on the collective influent function. In some embodiments, the ranked outcomes are processed further to determine shortlisted outcomes. The shortlisted outcomes may be determined based on: a threshold satisfaction score, a threshold dissonance score, a threshold equality factor; a threshold rank; or a combination of one or more of the above. One or more of these may be defined by the survey participants. In some embodiments, the shortlisted outcomes are determined by comparing one or more of the threshold values with the corresponding values associated with each outcome. The shortlisted outcomes may represent a set of possible outcomes. The shortlisted outcomes may then be ranked based on one or more criteria, for example the collective influent function. On ranking the potential outcomes or the shortlisted potential outcomes based on the collective influent function, the top ranked outcome may be selected as a final outcome. In particular embodiments, a shortlist of the top ranked outcomes can be submitted for another decision-making process such as a direct vote.

In some embodiments, a confidence rating may be provided for the issues and options based on the shortlisted outcomes. The shortlisted outcomes are further processed to identify a frequency of occurrence of one or more options associated with the shortlisted outcomes. For example, suppose that there are 10 shortlisted outcomes. Each shortlisted outcome is associated with one or more options and one or more issues. If 4 shortlisted outcomes are associated with an option a1, and 3 shortlisted outcomes are associated with an option a2, the frequency of occurrence of option a1 is 4 and the frequency of occurrence of option a2 is 3. Based on the frequency of occurrence of an issue or an option, a confidence rating is provided for the issue or the option. The confidence rating represents a confidence of the survey participants in the issue or the option for solving the problem.

In particular embodiments, a revised influent level for each participant is determined based on the final collective outcome associated with a survey, the current influent level of the participant and the satisfaction score for the participant associated with the selected outcome. In some embodiments, a function $\theta(D(t), x)$ determining the influent level for participant x for decisions at different times (e.g. from previous surveys) may also be considered in the determination of the revised influent level of participant x. The influent level represents the influence of a participant in the selection of an outcome. The revised influent level may be used in future surveys participated in by the participant. The revised influent level for a participant is updated in the participant profile of the participant to be referred to when such future surveys are conducted.

In some embodiments, the revised influent level for a participant is allocated in such a manner so as to compensate for a low satisfaction level achieved by the participant for the final collective outcome of a survey. For example, in a decision series for making a plurality of decisions, a group of participants may have achieved lower satisfaction as compared to another group of participants. In such a scenario, the group of participants who had a lower satisfaction may be provided with increased influent levels for future surveys so that the chosen collective outcome for such surveys may be more satisfactory to such participants. The revised influent level for a participant may be determined based on the participant's satisfaction associated with the chosen collective outcome, the maximum satisfaction of any participant for the chosen collective outcome, and/or the current influent level of the participant.

In one example embodiment, after choosing an outcome O for a decision D based on the satisfaction scores for the survey participants, the influent level of participants may be reduced from the starting influent level. For the participant x having a satisfaction score of Sat(D'(O),x) for a chosen outcome O, the reduced influent level for the participant x is determined by:

$$T1(\theta, x) = \theta(x) - \frac{\theta(O, x) * Sat(D'(O), x)}{\max\{Sat(D'(O), y) \forall y\}} \quad (36)$$

where $\theta(x)$ is the starting influent level of the participant x, $\theta(O, x)$ is the influent level of the participant x for the outcome O, and max $\{Sat(D'(O), y) \text{ for } \forall y\}$ is the maximum satisfaction of one or more participants for the outcome O. $T1(\theta, x)$ may be used as the starting influent levels for the participant x for a subsequent decision.

In some embodiments, recycled influent levels for survey participant x may be determined as a function of time t. The recycled influent levels for the participant x for O may be determined by the following equation:

$$T2(T1(\theta, x)) = T1(\theta, x) + \frac{\theta(x)}{\sum_{\forall y \in P} \theta(y)} * \left(\sum_{\forall y \in P} \theta(y) - \sum_{\forall y \in P} T1(\theta, y)\right) \quad (37)$$

Thus, starting influent levels for the participant x for the subsequent decision D(t+1) may be determined by:

$$\theta(D(t+1),x)=T2(T1(\theta(D(t),x))) \quad (38)$$

Figure 9:
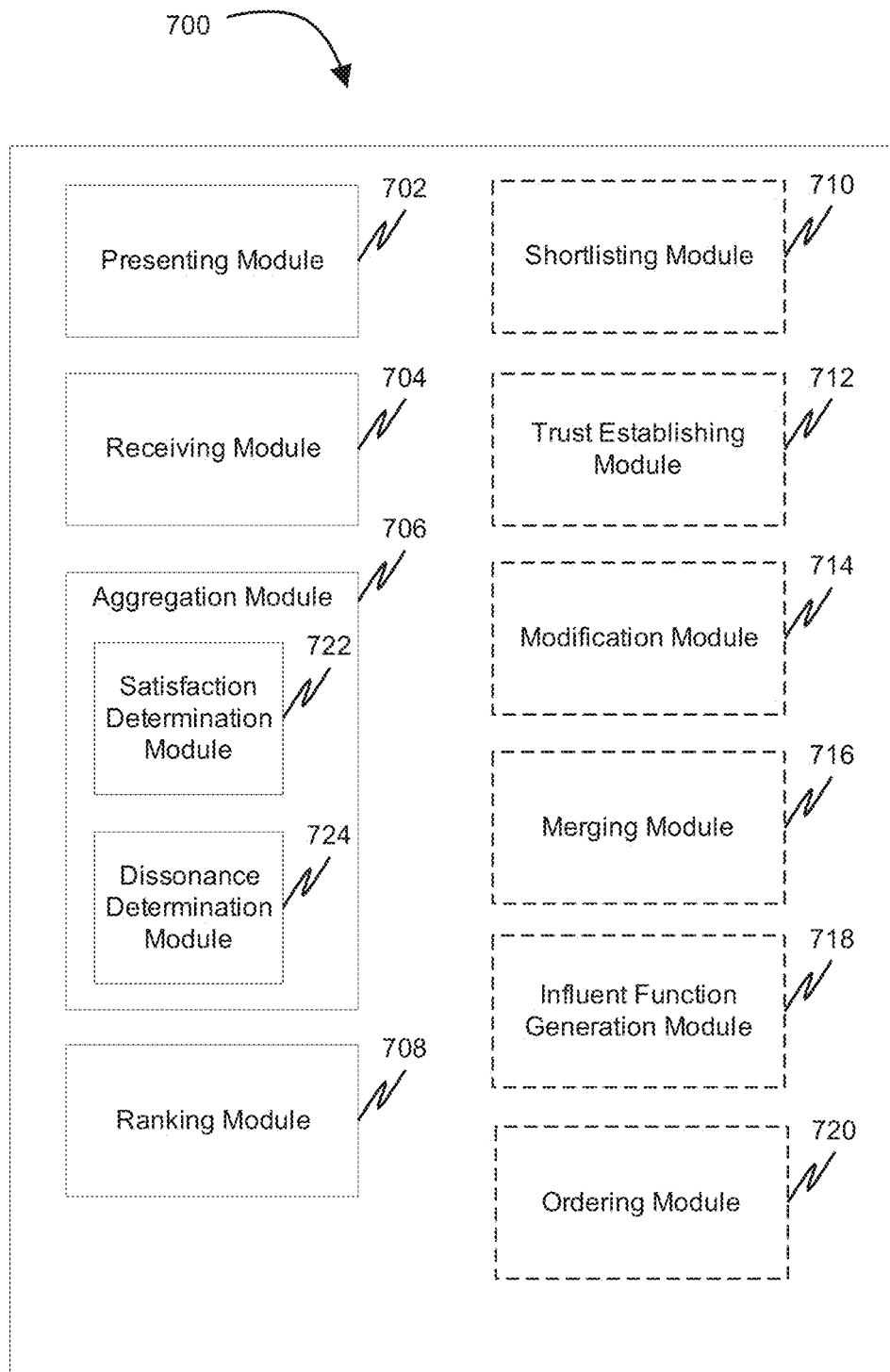
FIG. 9 is a block diagram of a system in accordance with one embodiment.

FIG. 9 illustrates a block diagram of a system 700 for conducting surveys according to various embodiments. System 700 includes a plurality of modules, some of which are optional as indicated by the dotted lines in FIG. 9. The modules may be implemented by one or more computers configured to perform the module's functions as described. For example, a processing unit in the computer may execute software routines to perform the functions carried out by the module. In the illustrated embodiment, system 700 includes a presenting module 702, a receiving module 704, an aggregation module 706, and a ranking module 708. These modules work in conjunction with each other for conducting a survey. Presenting module 702 is configured to present issues and options associated with a survey to the survey participants. (As discussed above, options may be categorized by issue.) Presenting module 702 may include a user interface through which the issues and options are displayed to the participants. FIG. 4 shows an example of a group of issues and corresponding options as presented to a survey participant in a user interface. Further, presenting module 702 of system 700 may be configured to present one or more potential outcomes associated with the issues and options to the survey participants.

Each particular combination of the available options is a potential outcome for the survey. However, as already noted above, some combinations might lead to non-actionable outcomes. In this regard, system 700 may include a shortlisting module 710 for eliminating one or more non-actionable outcomes from the potential outcomes associated with the survey. To eliminate the non-actionable outcomes, survey administrators and/or survey participants may specify one or more constraints or one or more rules. Constraints can be framed as Boolean logical relations between options and groups of options. Rules can be framed as mathematical or logical functions based on influent functions and characteristics associated with options or outcomes. Shortlisting module 710 analyses the plurality of potential outcomes associated with a survey based on the constraints or rules specified for that survey and eliminates any potential outcomes that are not actionable. The shortlisted potential outcomes may be presented to the participants by presenting module 702.

The issues and options associated with a survey are presented to each survey participant for ranking by the participant. Various methods of ranking are further explained in conjunction with FIG. 3. Receiving module 704 receives the ranking of issues and options provided by each participant. These rankings may be used as the basis for influent functions (as explained in conjunction with FIG. 3). In some embodiments, rankings may be recommended to a participant by another participants based on a trust rank assigned to the other participant. A participant can give another participant more than one trust rank, depending on their expertise in different areas under consideration. For those participants to whom the participant has not assigned a trust rank, a trust rank may be established by considering a trust propagation factor and a trust decay factor (as explained in conjunction with FIG. 3). In this case, system 700 may include a trust establishing module 712 to determine a trust rank for those participants for whom the participant has not directly assigned a trust rank. A trust rank may also be established by considering historical voting information.

In some embodiments, system 700 includes a modification module 714 to enable a participant to create new influent functions based on existing published influent functions. Modification module 714 may be configured to present influent functions created by other participants. The participant may select one or more of these existing influent functions and modify the selected influent functions in some manner to create a new influent function (as explained in conjunction with FIG. 3). In some embodiments, modification module 714 may include a user interface to allow a participant to modify the influent functions. In particular embodiment, modification module 714 may be configured to modify influent functions using one or more rules. Rules can express inequalities or Boolean statements which can lead to different functions if satisfied or not satisfied.

System 700 may include a merging module 716 configured to allow merging of two or more influent functions associated with a survey. Merging module 716 may include a user interface to allow a survey participant to select two or more existing influent functions for merging. The influent functions may be associated with other survey participants. In this case, the influent functions may be considered as starting influent functions. Merging the influent functions involves assigning a weight to each of the influent functions and combining them to form a single influent function. Merging the influent functions to create a single influent is further explained in conjunction with FIG. 3. In some embodiments, merging module 716 is configured to create one or more influent functions by merging existing influent functions using one or more rules.

In some embodiments, system 700 may include an influent function generation module 718 for generating an influent function for a participant (or generating an ordinally ranked list of the potential outcomes) based on one or more existing influent functions associated with the participant and one or more potential outcomes chosen for the participant. For example, the participant may initially create one or more influent functions for a survey by: ranking the issues and options, ranking the issues and options based on one or more criteria, modifying one or more existing influent functions, and/or merging two or more existing functions as explained above. Based on the influent functions created by the participant, each potential outcome for the survey (corresponding to a particular combination of options) may be automatically ranked by an ordering module 720. Ordering module 720 works in conjunction with presenting module 702 to present the ordered potential outcomes to the participant. For each outcome, the participant may confirm or change the order in which that outcome has been automatically ranked (as explained in conjunction with FIG. 3). Receiving module 704 receives the ranks provided for potential outcomes and works in conjunction with influent function generation module 718 to generate an influent function for the participant based on the initially created influent functions and the ranked outcomes.

An aggregation module 706 aggregates all of the created influent functions across the plurality of participants to generate a collective influent function for each survey. As explained in detail above in conjunction with FIG. 3, determination of the collective influent function for a survey may take into consideration satisfaction scores and/or dissonance scores associated with the potential outcomes. To this end, aggregation module 706 may include a satisfaction determination module 722 for calculating a degree of satisfaction associated with each participant for each potential outcome, and a dissonance determination module 724 for calculating a measure of difference in satisfaction between the participants for each potential outcome. For each participant, satisfaction determination module 722 determines a satisfaction score for each potential outcome that indicates how satisfied the participant would be with that potential outcome. In some embodiments, the satisfaction score and dissonance score associated with an outcome can be determined by considering the results of previous surveys and information associated with those surveys stored in the participant's profile, including the weight given by the participant to those surveys.

In other embodiments, in order to determine a satisfaction score for each potential outcome for a participant, the plurality of potential outcomes may be first automatically ordered by ordering module 720 in accordance with the final influent function developed by the participant. Presenting module 702 may then present the ordered potential outcomes to the participant. Thereafter, the participant may manually rank one or more of the potential outcomes by providing a most preferred potential outcome, a second most preferred outcome and so on.

On determining the satisfaction score for each potential outcome for each participant, dissonance determination module 724 determines the dissonance score associated with each potential outcome based on one or more of the satisfaction score of the participants, an average satisfaction score for the outcome, a maximum rank given by the participant to the outcome, the weight given by the participant to the outcome, an advantage quotient associated with each outcome, a disadvantage quotient associated with each outcome and the influent level of the participant.

The dissonance score may also be based on one or more of a standard deviation of satisfaction for the outcome, a number of participants having a higher satisfaction score than the participant and a number of participants having a lower satisfaction score than the participant, a difference in satisfaction between a preferred outcome of the participant and the chosen collective outcome for the survey, and the sum of differences in satisfaction for the outcome across the plurality of participants. Methods for calculating the dissonance score are explained in more detail in conjunction with FIG. 3.

On determining the collective influent function based on the satisfaction score and the dissonance score associated with each participant, ranking module 708 ranks the potential outcomes based on the collective influent function. In some embodiments, ranking module 708 may further process the ranked outcomes to determine shortlisted outcomes. The shortlisted outcomes may be determined based on one or more of a threshold satisfaction score, a threshold dissonance score, a threshold equality factor and a threshold rank. These may be defined by the survey participants. In some embodiments, the shortlisted outcomes may be determined by comparing one or more of the threshold values with the corresponding values associated with each outcome. The shortlisted outcomes may represent a set of possible outcomes. The shortlisted outcomes may then be ranked based on one or more criteria, for example the collective influent function. On ranking the potential outcomes or the shortlisted potential outcomes based on the collective influent function, the top ranked outcome may be selected as a final collective outcome or a shortlist of the top ranked outcomes can be submitted for another decision-making process such as a direct vote.

Based on the final collective outcome associated with a survey, the influent level of each participant and the satisfaction score of each participant associated with the selected outcome, a revised influent level for each participant may be determined. The revised influent level for a participant may be applied in a future survey to compensate for a satisfaction level achieved by the participant in a current survey due to selection of the final collective outcome as explained in conjunction with FIG. 3.

Thus, the disclosed methods and systems enable surveys to be conducted to identify a collective outcome for each survey aiming to satisfy the largest number of the survey participants and minimize dissonance. The satisfaction and dissonance of the participants may be carried through from one survey to another to compensate a participant who had a relatively low satisfaction in a previous survey.

As discussed above, systems 100 (FIG. 1), 200 (FIG. 2) and 700 (FIG. 9) may be configured to perform one or more of the methods described herein. Aspects of the technology (such as the methods described herein) may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. processor, program memory, database, user interface, server, client device, plug-in, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

As will be apparent to those skilled in the art in the light of the foregoing disclosure, many alterations and modifications are possible. For example:

In some cases it is the survey administrator who defines the issues, options and constraints. In some embodiments the survey participants may be responsible for defining the issues, options and/or constraints. In particular embodiments, the survey participants may be able to suggest, for addition to the list of available outcomes, a new option for an existing issue or a new issue and associated options. If there is sufficient support for these suggestions by other survey participants (e.g. these options may also have been suggested or approved by other survey participants), or if the survey administrator approves, then the new options may be added to the survey.

In other embodiments, different subsets of the participants may be responsible for different aspects of the tasks of proposing, shortlisting, editing and categorizing options, defining issues and sub-issues, assigning characteristics and applying constraints.

While machine-implemented embodiments of survey conducting and collective decision-making methods and systems are disclosed herein, in certain other embodiments some of the steps may be performed manually. For example, in some cases one may manually collect survey data (e g rankings of issues and options) using paper questionnaires completed by a survey participant. The survey responses may be gathered and input into a computer system which provides the data to a data processor for processing and analysis in accordance with the methods described herein.

While a number of exemplary aspects and embodiments have been discussed above, those of skill in the art will recognize certain modifications, permutations, additions and sub-combinations thereof. It is therefore intended that the scope of the following appended claims and claims hereafter introduced should not be limited by the preferred embodiments set forth in the examples, but should be given the broadest interpretation consistent with the description as a whole.

What is claimed is:

1. A machine-implemented method of determining a collective outcome for a survey from a plurality of potential outcomes, the method comprising the following steps:
   (a) defining a plurality of options, wherein each one of the plurality of options is associated with one of a plurality of issues;
   (b) automatically determining the plurality of potential outcomes based on the plurality of options, and applying one or more predefined constraints to the plurality of potential outcomes to determine a plurality of actionable outcomes;
   (c) storing the plurality of actionable outcomes on a data storage module of a server;
   (d) for each one of the plurality of options, generating and displaying a visual prompt for a ranking indicative of a value accorded to the option, the visual prompt comprising a graphical control element in the form of one or more slider widgets each having a movable indicator, and presenting the visual prompt to a plurality of survey participants via one or more client devices, wherein a position of the indicator on one of the one or more slider widgets is automatically constrained and adjusted based on the values accorded to the other options;
   (e) for each of the plurality of options, and for each of the plurality of survey participants, receiving at the server a value for the ranking, wherein the value for the ranking is based on a position of the movable indicator on each of the one or more slider widgets;
   (f) for each of the plurality of survey participants, applying, by a data processor of the server, the values for the rankings accorded to the plurality of options by the survey participant to determine an influent function associated with the survey participant;
   (g) for each of the survey participants, and for each of the actionable outcomes retrieved from the data storage module, calculating a satisfaction score by the data processor applying to the actionable outcome the influent function associated with the survey participant, and storing the satisfaction score on the data storage module;
   (h) for each of the actionable outcomes retrieved from the data storage module, calculating a collective dissonance score by the data processor based on the satisfaction scores for the actionable outcome calculated in step (g) and storing the collective dissonance score on the data storage module, wherein the collective dissonance score is indicative of a measure of difference in the satisfaction scores between the survey participants;
   (i) ordering the actionable outcomes stored in the data storage module based on a weighted combination of the satisfaction scores and the collective dissonance score for each of the actionable outcomes stored in the data storage module;
   (j) selecting a collective outcome to the survey stored in the data storage module based at least in part on the order of the actionable outcomes determined in step (i);
   (k) displaying via the one or more client devices a graphical representation that presents the collective outcome, and the satisfaction scores and the collective dissonance score for each of the actionable outcomes; and
   (l) automatically repeating steps (f) through (j) to determine a new collective outcome each time a value for a ranking is modified by movement of an indicator on one of the one or more sliding widgets, and, in response to determining the new collective outcome, updating the graphical user representation to display the new collective outcome.

2. The method of claim 1 comprising, for each of the actionable outcomes, calculating a collective satisfaction score by the data processor based on a weighted combination of the satisfaction scores, wherein each of the satisfaction scores is weighted in accordance with an influent level of the survey participant associated with the satisfaction score, and wherein ordering the actionable outcomes comprises determining a weighted combination of the collective satisfaction score and the collective dissonance score.

3. The method of claim 2 comprising normalizing the influent levels of the survey participants by ensuring that $0<\text{Sat}(O, x)<1$ for all of the actionable outcomes and the survey participants, where $\text{Sat}(O, x)$ defines a normalized satisfaction for a survey participant x to an outcome O and is given by:

$$Sat(O,x) = Sat'(O,x)^{P^x}$$

where $P^x$ is determined by taking $n=|O^a|$ and finding $P^x$ for each x in P such that:

$$\sum_{O \in O^a} Sat'(O, x)^{P^x} = \frac{n}{2}.$$

4. The method of claim 2 comprising, for one or more of the survey participants, adjusting the influent levels of each survey participant based on the survey participant's satisfaction score for a collective outcome from a previous survey, for use in determining a weighted combination of satisfaction scores in the current survey.

5. The method of claim 2 wherein the weighted combination of the collective satisfaction score and the collective dissonance score is determined based on one or more explicit or assumed collective agreements between the survey participants relating to the acceptability of the actionable outcome.

6. The method of claim 1, wherein for each option the ranking comprises an indication of a degree of support accorded to the option and an indication of the importance of the issue associated with the option.

7. The method of claim 6 wherein one of the influent functions is in a first issue domain, and the method comprises translating the one of the influent functions into an equivalent influent function in a second issue domain different from the first issue domain.

8. The method of claim 6 wherein the ranking from one of the survey participants for one of the options defines the degree of support accorded to the option as a function of a characteristic over a predefined range of the characteristic.

9. The method of claim 1 wherein calculating the collective dissonance score for each actionable outcome is based on at least one of:
a standard deviation of satisfaction scores for the survey participants;
for each of the survey participants, a number of survey participants having a higher satisfaction score than the survey participant and a number of survey participants having a lower satisfaction score than the survey participant;
for each of the survey participants, a difference in satisfaction scores associated with a preferred outcome of the survey participant for the survey and the collective outcome for the survey;
a sum of differences in satisfaction scores for the actionable outcome; and
for each of the survey participants and for each of the actionable outcomes, an influent level associated with one or more of: the survey participant and the actionable outcome.

10. The method of claim 1 comprising determining initial values of the rankings of the options for each of the survey participants based on a starting influent function retrieved from a repository of influent functions.

11. The method of claim 10 comprising modifying the starting influent function in accordance with instructions from the survey participant, wherein the modifying comprises at least one of: varying a ranking of an option in the starting influent function, and applying a rule to the starting influent function.

12. The method of claim 1 comprising determining the rankings of the options for each of the survey participants by:
obtaining an initial influent function;
applying the initial influent function to each of the actionable outcomes to rank the actionable outcomes, and displaying to the survey participant a ranked list of the actionable outcomes; and
receiving from the survey participant a revised ranking for one or more of the actionable outcomes.

13. The method of claim 1 comprising determining initial values of the rankings of the options for a survey participant by merging first and second starting influent functions retrieved from a repository of influent functions to determine a new influent function in accordance with instructions from the survey participant, the new influent function stipulating a ranking for each of the options, wherein the merging comprises a weighted combination of the first and second starting influent functions.

14. The method of claim 1 comprising determining a recommended ranking for one of the survey participants for at least one of the options based on influent functions associated with one or more other survey participants, and displaying the recommended ranking to the one of the survey participants.

15. The method of claim 1 wherein if one of the survey participants does not indicate a ranking for one of the options, the data processor generates a ranking for the option in determining the influent function associated with the participant.

16. A system for determining a collective outcome for a survey from a plurality of potential outcomes, the system comprising:

a survey conductor having a first data processor and a first data storage module, the first data processor configured to:
define a plurality of options, wherein each one of the plurality of options is associated with one of a plurality of issues;
automatically determine the plurality of potential outcomes based on the plurality of options, and apply one or more predefined constraints to the plurality of potential outcomes to determine a plurality of actionable outcomes, and cause the plurality of actionable outcomes to be stored on the data storage module;
for each one of the plurality of options, generate and display a visual prompt for a ranking indicative of a value accorded to the option, the visual prompt comprising a graphical control element in the form of one or more slider widgets each having a movable indicator, wherein a position of the indicator on one of the one or more slider widgets is automatically constrained and adjusted based on the values accorded to the other options, and present the visual prompt to a plurality of survey participants via one or more client devices; and
a collective outcome generator in communication with the survey conductor, the collective outcome generator having a second data processor and a second data storage module, the second data processor configured to:
for each of the plurality of options, and for each of the plurality of survey participants, receive a value for the ranking obtained by the survey conductor, determine an influent function associated with the survey participant based on the value for the ranking and cause the influent function to be stored on the second data storage module;
for each of the survey participants, and for each of the actionable outcomes retrieved from the data storage module, apply to the actionable outcome the influent function associated with the survey participant to calculate a satisfaction score and cause the satisfaction score to be stored on the second data storage module;
for each of the actionable outcomes retrieved from the data storage module, calculate a collective dissonance score based on the calculated satisfaction scores for the actionable outcome, wherein the collective dissonance score is indicative of a measure of difference in the satisfaction scores between the survey participants and case the collective dissonance score to be stored on the second data storage module;
order the actionable outcomes based on a weighted combination of the satisfaction scores and the collective dissonance score for each of the actionable outcomes;
select a collective outcome to the survey based at least in part on the order of the actionable outcomes;
present to the one or more client devices a graphical representation of the collective outcome, and the satisfaction scores and the collective dissonance score for each of the actionable outcomes; and
automatically determine a new collective outcome each time a value for a ranking is modified by movement of an indicator on the one or more sliding widgets, and, in response to determining the new collective outcome, update the graphical representation to display the new collective outcome.

17. The system of claim 16 wherein the second data processor of the collective outcome generator is configured to, for each of the actionable outcomes, calculate a collective satisfaction score based on a weighted combination of the satisfaction scores, wherein each of the satisfaction scores is weighted in accordance with an influent level of the survey participant associated with the satisfaction score, and wherein the second data processor of the collective outcome generator is configured to order the actionable outcomes by determining a weighted combination of the collective satisfaction score and the collective dissonance score.

18. The system of claim 17 wherein the first data processor of the collective outcome generator is configured to normalize the influent levels of the survey participants by ensuring that $0 < Sat(O, x) < 1$ for all of the actionable outcomes and the survey participants, where $Sat(O, x)$ defines a normalized satisfaction for a survey participant x to an outcome O and is given by:

$$Sat(O,x) = Sat'(O,x)^{P^x}$$

where $P^x$ is determined by taking $n = |O^a|$ and finding $P^x$ for each x in P such that:

$$\sum_{O \in O^a} Sat'(O, x)^{P^x} = \frac{n}{2}.$$

19. The system of claim 17 wherein the first data processor of the collective outcome generator is configured to, for one or more of the survey participants, adjust the influent levels of each survey participant based on the survey participant's satisfaction score for the collective outcome from a previous survey, for use in determining a weighted combination of satisfaction scores in the current survey.

20. The system of claim 16 wherein each of the options is associated with one of a plurality of issues, wherein for the ranking of each option the first data processor of the survey collector is configured to receive an indication of a degree of support accorded to the option and an indication of the importance of the issue associated with the option.

21. The system of claim 20 wherein one of the influent functions is in a first issue domain, and the second data processor of the collective outcome generator is configured to translate the one of the influent functions into an equivalent influent function in a second issue domain different from the first issue domain.

22. The system of claim 16 wherein the second data processor of the collective outcome generator is configured to calculate the collective dissonance score for each actionable outcome based on at least one of:
   a standard deviation of satisfaction scores for the survey participants;
   for each of the survey participants, a number of survey participants having a higher satisfaction score than the survey participant and a number of survey participants having a lower satisfaction score than the survey participant;
   for each of the survey participants, a difference in satisfaction scores associated with a preferred outcome of the survey participant for the survey and the collective outcome for the survey;
   a sum of differences in satisfaction scores for the actionable outcome; and
   for each of the survey participants and for each of the actionable outcomes, an influent level associated with one or more of: the survey participant and the actionable outcome.

23. The system of claim 16 wherein the first data processor of the survey conductor is configured to determine initial values of the rankings of the options for each of the survey participants based on a starting influent function retrieved from a repository of influent functions.

24. The system of claim 23 wherein the first data processor of the survey conductor is configured to modify the starting influent function in accordance with instructions from the survey participant, by at least one of: varying a ranking of an option in the starting influent function, and applying a rule to the starting influent function.

25. The system of claim 16 wherein the first data processor of the survey conductor is configured to determine the rankings of the options for each of the survey participants by merging first and second starting influent functions retrieved from a repository of influent functions to determine a new influent function in accordance with instructions from the survey participant, the new influent function stipulating a ranking for each of the options, wherein the merging comprises a weighted combination of the first and second starting influent functions.

26. A machine-implemented method of determining a collective outcome for a survey from a plurality of potential outcomes, the method comprising the following steps:
   (a) defining a plurality of options, wherein each one of the plurality of options is associated with one of a plurality of issues;
   (b) automatically determining the plurality of potential outcomes based on the plurality of options, and applying one or more predefined constraints to the plurality of potential outcomes to determine a plurality of actionable outcomes;
   (c) for each one of the plurality of options, generating and displaying a visual prompt for a ranking indicative of a value accorded to the option, the visual prompt comprising a graphical control element in the form of one or more slider widgets each having a movable indicator, and presenting the visual prompt to a plurality of survey participants via one or more client devices, wherein a position of the indicator on one of the one or more slider widgets is automatically constrained and adjusted based on the values accorded to the other options;
   (d) for each of the plurality of options, and for each of the plurality of survey participants, receiving a value for the ranking, wherein the value of the ranking is based on a position of the movable indicator on each of the one or more slider widgets;
   (e) for each of the plurality of survey participants, applying the values for the rankings by the survey participants to determine an influent function associated with the survey participant;
   (f) for each of the survey participants, and for each of the actionable outcomes, calculating by a data processor of a server a satisfaction score by applying to the actionable outcome the influent function associated with the survey participant and storing the satisfaction score on the data storage module;
   (g) for each of the actionable outcomes, calculating by the data processor a collective dissonance score based on the satisfaction scores for the actionable outcome calculated in step (f) and storing the collective dissonance score on the data storage module;
   (h) ordering the actionable outcomes stored on the data storage module based on a weighted combination of the satisfaction scores and the collective dissonance score stored on the data storage module for each of the actionable outcomes;

(i) selecting a collective outcome to the survey stored in the data storage module based at least in part on the order of the actionable outcomes determined in step (h); and (j) displaying via the one or more client devices a graphical representation that presents the collective outcome, and the satisfaction scores and the collective dissonance score for each of the actionable outcomes; and (k) automatically repeating steps (e) through (i) to determine a new collective outcome each time a value for a ranking is modified by movement of an indicator on one of the one or more sliding widgets, and, in response to determining the new collective outcome, updating the graphical user representation to display the new collective outcome.

27. A computer program product comprising a non-transitory computer readable medium having instructions recorded thereon for execution by a processor on a computer to determine a collective outcome for a survey from a plurality of potential outcomes, wherein the instructions comprise the steps of:

(a) defining a plurality of options, wherein each one of the plurality of options is associated with one of a plurality of issues;

(b) automatically determining the plurality of potential outcomes based on the plurality of options, and applying one or more predefined constraints to the plurality of potential outcomes to determine a plurality of actionable outcomes;

(c) storing the plurality of actionable outcomes on a data storage module of a server;

(d) for each one of the plurality of options, generating and displaying a visual prompt for a ranking indicative of a value accorded to the option, the visual prompt comprising a graphical control element in the form of one or more slider widgets each having a movable indicator, and presenting the visual prompt to a plurality of survey participants via one or more client devices, wherein a position of the indicator on one of the one or more slider widgets is automatically constrained and adjusted based on the values accorded to the other options;

(e) for each of the plurality of options, and for each of the plurality of survey participants, receiving at the server a value for the ranking, wherein the value for the ranking is based on a position of the movable indicator on each of the one or more slider widgets;

(f) for each of the plurality of survey participants, applying, by a data processor of the server, the values for the rankings accorded to the plurality of options by the survey participant to determine an influent function associated with the survey participant;

(g) for each of the survey participants, and for each of the actionable outcomes, calculating a satisfaction score by applying to the actionable outcome the influent function associated with the survey participant;

(h) for each of the actionable outcomes, calculating a collective dissonance score based on the satisfaction scores for the actionable outcome calculated in step (g);

(i) ordering the actionable outcomes based on a weighted combination of the satisfaction scores and the collective dissonance score for each of the actionable outcomes; and (j) selecting a collective outcome to the survey based at least in part on the order of the actionable outcomes determined in step (i), (k) displaying via the one or more client devices a graphical representation that presents the collective outcome, and the satisfaction scores and the collective dissonance score for each of the actionable outcomes; and (l) automatically repeating steps (f) through (j) to determine a new collective outcome each time a value for a ranking is modified by movement of an indicator on one of the one or more sliding widgets, and, in response to determining the new collective outcome, updating the graphical user representation to display the new collective outcome.

28. Apparatus for determining a collective outcome for a survey from a plurality of potential outcomes, the apparatus comprising:

(a) means for determining a plurality of potential outcomes based on a plurality of options, and means for applying one or more predefined constraints to the plurality of potential outcomes to determine a plurality of actionable outcomes;

(b) means for generating and displaying a visual prompt for a ranking indicative of a value accorded to the option, the visual prompt comprising a graphical control element in the form of one or more slider widgets each having a movable indicator, and presenting the visual prompt to a plurality of survey participants via one or more client devices, wherein a position of the indicator on one of the one or more slider widgets is automatically constrained and adjusted based on the values accorded to the other options;

(c) means for receiving a value for the ranking for each of the plurality of options, and for each of the plurality of survey participants, wherein the value for the ranking is based on a position of the movable indicator on each of the one or more slider widgets;

(d) means for applying the values for the rankings accorded to the plurality of options by the survey participant to determine an influent function associated with the survey participant;

(e) means for calculating a satisfaction score for each of the survey participants and for each of the actionable outcomes based on the influent function associated with the survey participant;

(f) means for calculating a collective dissonance score for each of the actionable outcomes based on the satisfaction scores for the actionable outcome calculated in step (e);

(g) means for ordering the actionable outcomes based on a weighted combination of the satisfaction scores and the collective dissonance score for each of the actionable outcomes;

(h) means for selecting a collective outcome to the survey based at least in part on the order of the actionable outcomes determined in step (g);

(i) means for displaying via the one or more client devices a graphical representation that presents the collective outcome, and the satisfaction scores and the collective dissonance score for each of the actionable outcomes; and (j) means for automatically repeating steps (d) through (h) to determine a new collective outcome each time a value for a ranking is modified by movement of an indicator on one of the one or more sliding widgets, and, in response to determining the new collective outcome, updating the graphical user representation to display the new collective outcome.

* * * * *